(12) United States Patent
Deng

(10) Patent No.: US 11,190,730 B2
(45) Date of Patent: *Nov. 30, 2021

(54) VIDEO EXTENDERS, CONTROL METHODS THEREFOR AND COAXIAL VIDEO-CONTROLLING TRANSMISSION DEVICES

(71) Applicant: ZHEJIANG DAHUA TECHNOLOGY CO., LTD., Zhejiang (CN)

(72) Inventor: Zhiji Deng, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/070,894

(22) Filed: Oct. 14, 2020

(65) Prior Publication Data

US 2021/0029324 A1 Jan. 28, 2021

Related U.S. Application Data

(63) Continuation of application No. 16/449,374, filed on Jun. 22, 2019, now Pat. No. 10,827,148, which is a (Continued)

(30) Foreign Application Priority Data

Dec. 23, 2016 (CN) .......................... 201611208697.7

(51) Int. Cl.
*H04N 7/10* (2006.01)
*H04N 7/18* (2006.01)

(52) U.S. Cl.
CPC ............... *H04N 7/102* (2013.01); *H04N 7/18* (2013.01); *H04N 7/183* (2013.01)

(58) Field of Classification Search
CPC ........ H04N 7/18; H04N 7/183; H04N 21/631; H04N 5/268; H04N 7/102
See application file for complete search history.

(56) References Cited

U.S. PATENT DOCUMENTS 5,177,621 A * 1/1993 Ohtaki ............... H04N 1/00002
358/405
6,014,386 A 1/2000 Abraham
(Continued)

FOREIGN PATENT DOCUMENTS

| CN | 1283041 A | 2/2001 |
| CN | 101646110 A | 2/2010 |

(Continued)

OTHER PUBLICATIONS

International Search Report in PCT/CN2017/116379 dated Feb. 14, 2018, 4 pages.
(Continued)

*Primary Examiner* — Paulos M Natnael
(74) *Attorney, Agent, or Firm* — Metis IP LLC

(57) ABSTRACT

A system and method for filling light for signal communication are provided. The system may include at least one transmission controller. The at least one transmission controller may include a closed loop suppression module coupled to a node and a Video Output, wherein the Video Output is configured to output a reverse control signal, the node is coupled to the Video Output and is configured to receive the reverse control signal, and the closed loop suppression module is configured to: receive the reverse control signal, and adjust at least one of a voltage of the node or a voltage of the Video Output according to the voltage of the reverse control signal.

20 Claims, 16 Drawing Sheets

Related U.S. Application Data continuation of application No. PCT/CN2017/116379, filed on Dec. 15, 2017.

(56) References Cited

U.S. PATENT DOCUMENTS

| | | |
|---|---|---|
| 7,256,837 B2 | 8/2007 | Nio et al. |
| 2012/0050550 A1 | 3/2012 | Oba et al. |
| 2015/0326775 A1 | 11/2015 | Oba et al. |

FOREIGN PATENT DOCUMENTS

| | | |
|---|---|---|
| CN | 201887879 U | 6/2011 |
| CN | 204615954 U | 9/2015 |
| CN | 205792999 U | 12/2016 |
| CN | 106303299 A | 1/2017 |
| FR | 2604583 A1 | 4/1988 |
| WO | 2018113590 A1 | 6/2018 |

OTHER PUBLICATIONS

Written Opinion in PCT/CN2017/116379 dated Feb. 14, 2018, 6 pages.
First Office Action in Chinese Application No. 201611208697.7 dated Jan. 11, 2019, 14 pages.
The Extended European Search Report in European Application No. 17884699.4 dated Dec. 3, 2019, 7 pages.

\* cited by examiner

| In a first stage, a video drive module may receive a video signal sent by a Video Input, amplify the received video signal and transmit the amplified video signal to a first node. A closed loop suppression module may receive the video signal transmitted to the first node and transmit the received video signal to the Video Output | S801 |

| In a second stage, the closed loop suppression module may receive a reverse control signal sent by the Video Output and adjust a voltage of the first node and a voltage of the Video Output according to the voltage of the reverse control signal. A reverse control extraction module may receive the voltage of the Video Output and the voltage of the first node, and output a conduction control signal only when the voltage of the Video Output is greater than the voltage of the first node. A reverse control superposition module may receive the conduction control signal and provide a reference voltage signal of a reference voltage end to the Video Input under the control of the received conduction control signal | S802 |

FIG. 8

VIDEO EXTENDERS, CONTROL METHODS THEREFOR AND COAXIAL VIDEO-CONTROLLING TRANSMISSION DEVICES

CROSS-REFERENCE TO RELATED APPLICATIONS

This application is a continuation of U.S. application Ser. No. 16/449,374, filed on Jun. 22, 2019, which is a continuation of International Application No. PCT/CN2017/116379, filed on Dec. 15, 2017, which claims priority to Chinese Application No. 201611208697.7, filed on Dec. 23, 2016. The entire contents of these applications are hereby incorporated herein by reference.

TECHNICAL FIELD

The present invention typically relates to a method and apparatus for signal communication, and more specifically to a video extender, a method to control the video extender, and a coaxial video-controlling transmission device applying the same.

BACKGROUND

Presently, many analog video data interfaces commercially available in the market using coaxial cables to transmit video data forward and control signals backward at the same time. FIG. 1A shows a framework of a coaxial reverse control transmission system in the prior art, the coaxial reverse control video transmission system includes a camera 110, a video storage device 120 and a 75-ohm coaxial cable 130. The acquired video signal may be processed by the camera 110 and sent to the video storage device 120 though the 75-ohm coaxial cable 130 for subsequent use. Specifically, the camera 110 may include: a video processing module 111, an interface module 112, a matching resistance 113 and a comparator 114. The video processing module 111 may communicate with the interface module 112 through a Video Digital Interface (VDI), and/or a Video Interface. The reverse control signal may be typically sent by the video storage device 120 at back end when the video signal is in a blanking period. At this time, the signal amplitude in the 75-ohm coaxial cable 130 may be determined by the voltage of the reverse control since the video signal is in the blanking period (the voltage of the video signal is a low voltage, typically being 0V). As shown in FIG. 1A, the reverse control signal may be typically extracted by comparing the signal of the 75-ohm coaxial cable 130 and a fixed level VREF by the comparator 114, and the reverse control signal may be sent to the interface module 112 having a digital parsing function in the form of a digital signal.

Still referring to FIG. 1A, although the reverse control signal can be extracted according to the above extraction method, the amplitude of the voltage of the video ("Video Output") output by the interface module 112 may be higher than the fixed voltage VREF when the video signal in a non-blanking period is transmitted, so that the comparator 114 may be triggered to output a signal to the interface module 112 when the video signal is in the non-blanking period. In order to avoid that the mis-extracted signals in the non-blanking period is sent to the video processing module 111 of the camera 110 in the form of a reverse control signal, the interface module 112 typically has a function of identifying the format of the video signal, thereby shielding all the mis-extracted signals in the non-blanking period from a video protocol. Since such a process needs to parse the video protocol, the video processing module 111 may acquire the reverse control information parsed by the interface module 112 through a common management interface (typically, an 120 interface) only after the interface module 112 has parsed the video protocol.

Based on the above traditional method for extracting the reverse control signal, in a video extender as shown in FIG. 2, a video driver 203 may receive a video signal from a video in end 201 and drive and amplify the received video signal to transmit the video signal to a video out end 202, and a reverse control extraction module 204 may extract a high or low voltage of a reverse control signal from the video out end 202 and transmit the extracted high or low voltage of the reverse control signal to the video in end 201. At this time, the video driver 203 may amplify the high or low voltage of the reverse control signal and transmit the high or low voltage to the video out end 202 in turn. When the high voltage of the reverse control signal is transmitted to the video in end 201, the high voltage may be driven and amplified by the video driver 203, and the driven and amplified high voltage may be higher than the fixed voltage VREF, so that the reverse control extraction module 204 may be triggered to output a high voltage to the video in end 201, and thereby the positive feedback may be infinitely amplified, and thus the video in end 201 and the video out end 202 may be kept in a high voltage condition, causing the system unable to work.

In order to avoid the above positive feedback effect, the video extender based on the above traditional method for extracting the reverse control signal in the prior art is as shown in FIG. 3, typically including a processor 210, an input interface module 220, an output interface module 230, a reverse control superimposing module 240, and a reverse control extraction module 250. The input interface module 220 is configured to send the video signal received from the video in end 201 to the processor 210, and the processor 210 is configured to convert the received video signal into a digital signal and process the same and output the converted analog signal to the video out end 202 through the output interface module 230. The reverse control extraction module 250 is configured to extract the reverse control signal and send the extracted reverse control signal to the output interface module 230, the output interface module 230 is configured to receive the reverse control signal and send the received reverse control signal to the processor 210, and the processor 210 is configured to convert the received reverse control signal into a digital signal and process the same and output the converted analog signal to the video in end 201 through the input interface module 220 and the reverse control superimposing module 240. Although such a framework can avoid the positive feedback effect of the video extender shown in FIG. 2, the structure is relatively complex, and the framework cost is high since it is necessary to adopt complex A/D conversion and D/Ac conversion frameworks to achieve the above. Therefore, there is a need to provide a device with a simplified structure to avoid the positive feedback effect.

SUMMARY

According to an aspect of the present disclosure, a system for signal communication may include at least one transmission controller. The at least one transmission controller may include a closed loop suppression module coupled to a node and a Video Output, wherein the Video Output is configured to output a reverse control signal, the node is coupled to the Video Output and is configured to receive the reverse control signal, and the closed loop suppression module is configured to: receive the reverse control signal, and adjust at least one of a voltage of the node or a voltage of the Video Output according to the voltage of the reverse control signal.

In some embodiments, the at least one transmission controller may further include a reverse control extraction module configured to: detect the voltage of the node and the voltage of the Video Output; and output a conduction control signal when the voltage of the Video Output is larger than the voltage of the node.

In some embodiments, the video signals are transmitted from a Video Input, and the at least one transmission controller may further include a reverse control superimposing module configured to: receive the conduction control signal; and provide a reference voltage signal of a reference voltage end to the Video Input, in response to the receipt of the conduction signal.

In some embodiments, the reverse control extraction module may include a comparator, wherein: a forward input of the comparator is coupled to the Video Output and is configured to detect the voltage of the Video Output; an inverting input of the comparator is coupled to the node and is configured to detect the voltage of the node; and an output of the comparator is coupled to the closed loop suppression module and the reverse control superimposing module, and is configured to output the conduction control signal to the closed loop suppression module and the reverse control superimposing module.

In some embodiments, the reverse control superimposing module may include an N-type transistor, wherein: a grid electrode of the N-type transistor is configured to receive the conduction control signal, a source electrode of the N-type transistor is coupled to the reference voltage end, and a drain electrode of the N-type transistor is coupled to the Video Input.

In some embodiments, the reverse control superimposing module may include a P-type transistor and an inverter, wherein: an input of the inverter is configured to receive the conduction control signal, an output of the inverter is coupled a grid electrode of the P-type transistor, a source electrode of the P-type transistor is coupled to the reference voltage end, and a drain electrode of the P-type transistor is coupled to Video Input.

In some embodiments, the reverse control signal has a first voltage level or a second voltage level smaller than the first voltage level.

In some embodiments, the first voltage level is equal to a voltage of the reference voltage end.

In some embodiments, the second voltage level is 0V.

In some embodiments, the closed loop suppression module may include a resistance and an N-type transistor, wherein: the resistance is coupled between the node and the Video Output, a grid electrode of the N-type transistor is configured to receive the conduction control signal, a source electrode of the N-type transistor is coupled to a ground terminal (GND), and a drain electrode of the N-type transistor is coupled to the node.

In some embodiments, the closed loop suppression module may include a resistance and a P-type transistor, and a inverter, wherein: the resistance is coupled between the node and the Video Output, an input of the inverter is configured to receive the conduction control signal, an output of the inverter is coupled to a grid electrode of the P-type transistor, a source electrode of the P-type transistor is coupled to a ground terminal (GND), and a drain electrode of the P-type transistor is coupled to the node.

In some embodiments, the video signals are transmitted from a Video Input, and the at least one transmission controller may further include a video driver coupled to the Video Input.

In some embodiments, the video driver is configured to amplify the video signals transmitted from the Video Input, and wherein: an input of the video driver is coupled to the Video Input to receive the video signals; and an output of the video driver is coupled to the node to send the amplified video signals to the node.

In some embodiments, the at least one transmission controller may further include a drive output protection module, and the video driver is coupled to the node through the drive output protection module.

In some embodiments, the drive output protection module is configured to receive the amplified video signals from the video driver, and transmit the amplified video signals to the node.

In some embodiments, the drive output protection module may include a resistance, wherein: a first end of the resistance is coupled to the video driver to receive the amplified video signals from the video driver, and a second end of the resistance is coupled to the node to transmit the received amplified video signals to the node.

In some embodiments, the at least one transmission controller may further include an impedance matching module including a matching resistance.

In some embodiments, the video signals are transmitted from a Video Input, a first end of the matching resistance is coupled to the Video Input, and a second end of the matching resistance is coupled to a ground terminal (GND).

In some embodiments, the closed loop suppression module is further configured to receive the video signals from the node, and transmit the received video signals to the Video Output.

In some embodiments, the reverse control signal has a first voltage level or a second voltage level smaller than the first voltage level, and the at least one transmission controller is at least configured to: adjust the voltage of the node to be smaller than the voltage of the Video Output, when the reverse control signal has the first voltage level; or adjust the voltage of the node to be larger than the voltage of the Video Output, when the output control signal has the second voltage level.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 illustrates an exemplary method for controlling a video extender, according to some embodiments of the present disclosure.

DETAILED DESCRIPTION

Figure 1A:
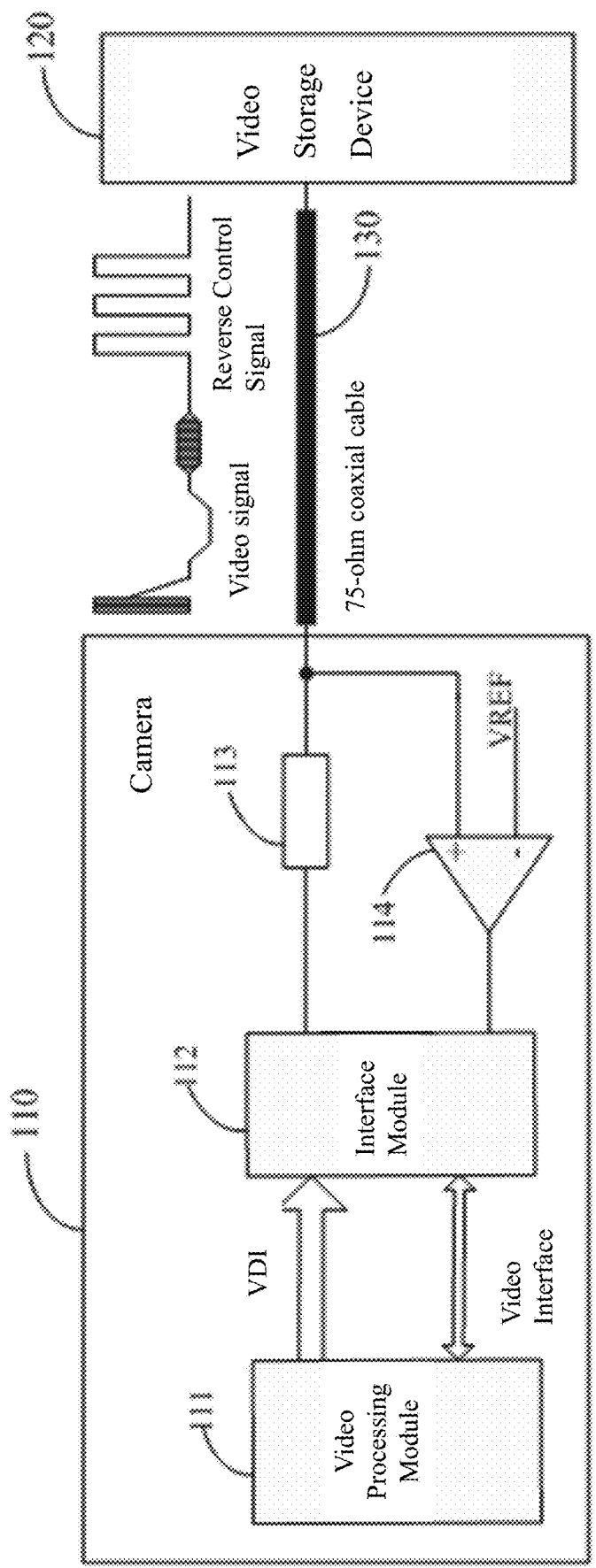
FIG. 1A illustrates a schematic diagram of a coaxial reverse control transmission system in prior art.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise.

It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices (e.g., processor 121) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

An aspect of the present disclosure relates to signal transmission, e.g., transmitting a control signal (e.g., a reverse control signal) of a video from a backend device (such as a video display or a port connected to the backend device) to a frontend device (such as a camera or a node connected to the frontend device) through a single cable (e.g., a coaxial cable). For example, an aspect of the present disclosure is to prevent the transmission of the reverse control signal from the node connected to the frontend device back to the port connected to the backend device (or simply referred to as a Video Output), according to the voltage of the reverse control signal. For example, to prevent said transmission of the reverse control signal, a transmission controller is configured to adjust at least one of a voltage of the node or a voltage of the Video Output according to the voltage of the control signal. The at least one transmission controller may adjust the voltage of the node to be smaller than the voltage of the Video Output, when the control signal has a high voltage level. Given that the transmission direction of the reverse control signal is from nodes having higher voltage levels to nodes having lower voltage levels, the transmission of the reverse control signal from the node to the Video Output is thus prevented.

Figure 1B:
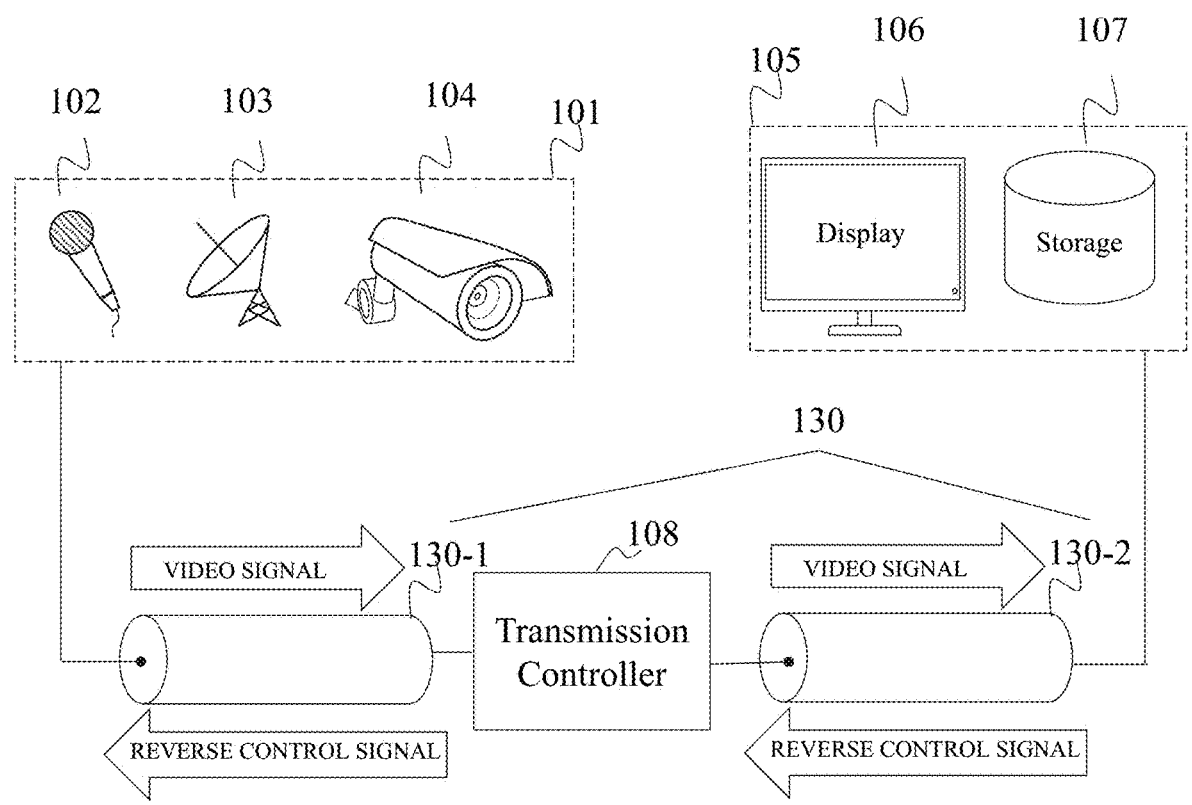
FIG. 1B illustrates a schematic diagram of a coaxial transmission system according to some embodiments of the present disclosure.
Figure 2:
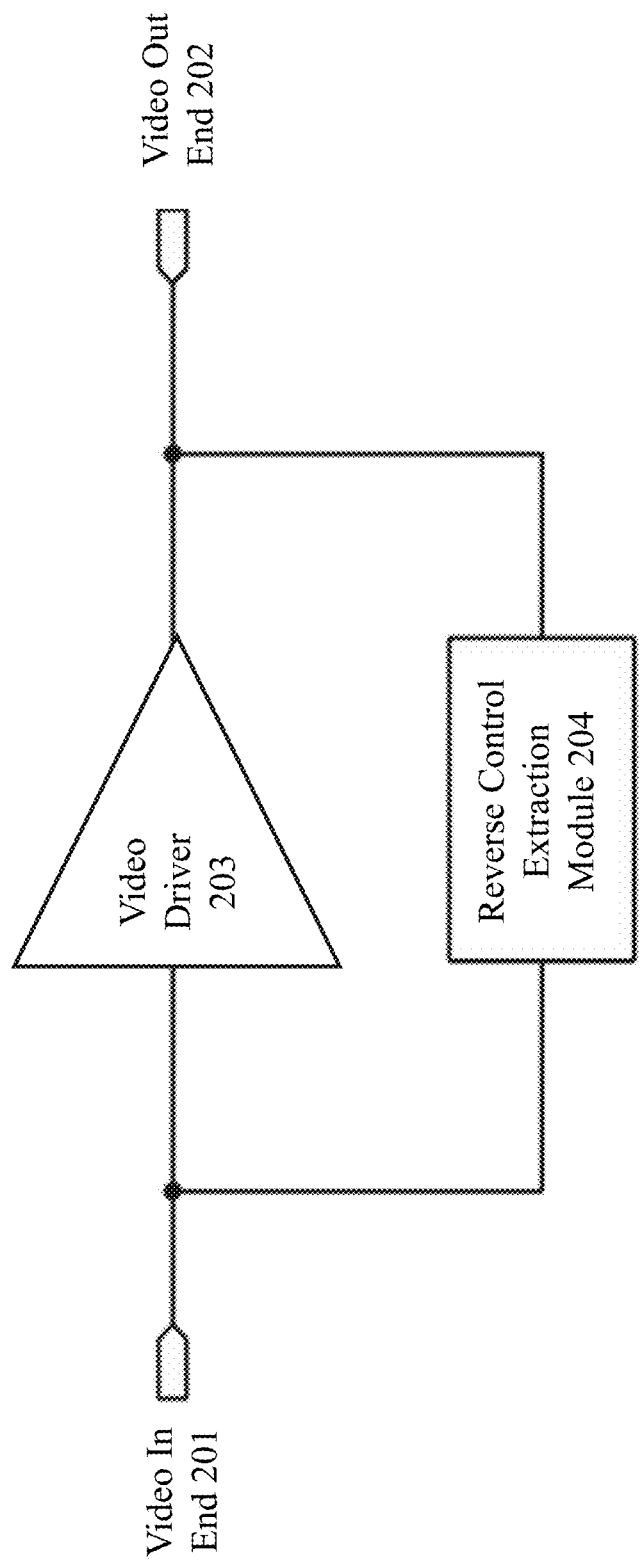
FIG. 2 illustrates a schematic diagram of a video extender in prior art.
Figure 3:
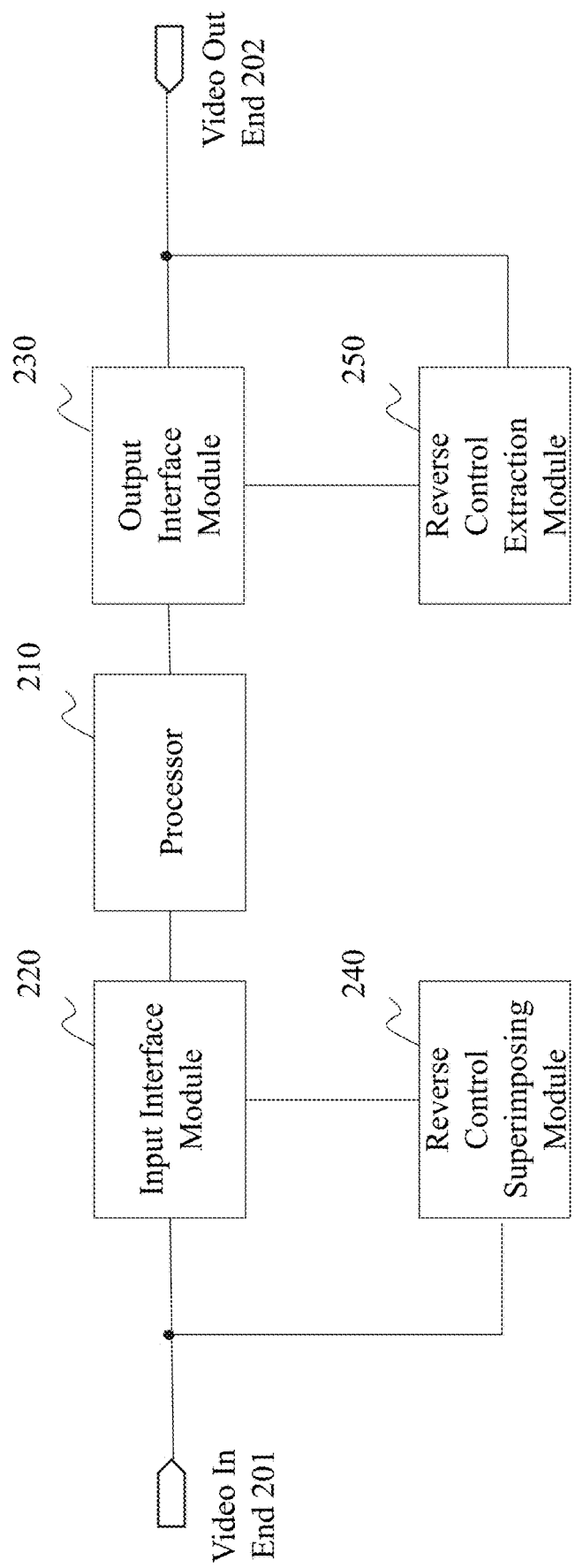
FIG. 3 illustrates a schematic diagram for extracting a reverse control signal in prior art.

FIG. 1B is a schematic diagram of a coaxial transmission system 100 according to some embodiments of the present disclosure. The coaxial transmission system 100 is configured for transmitting, through a single cable, signals between backend devices and frontend devices. As illustrated, the coaxial transmission system 100 may include a frontend device 101, a backend device 105, a single cable 130, and a transmission controller 108. Through the single cable 130 and the transmission controller 108, the frontend device 101 may transmit signals to the backend device 105, and/or receive signals therefrom. Merely for the purpose of illustration, in the present disclosure uses the system structure as shown in FIG. 1B as an example of the coaxial transmission system. One of ordinary skill in the art at the time of filing of this disclosure would understood that the system structure of single electronic device is equally well-known among the ordinary skilled person in the art.

The frontend device 101 may generate a signal and transmit the generated signal to the backend device 105 through the transmission controller 108. The signal may include a video signal, an audio signal, or the like, or any combination thereof. Merely for the purpose of illustration, in the present disclosure uses video signal to exemplify signals sent by the frontend device, other signals, such as video signals are equally well-known among the ordinary skilled person in the art. In some embodiments, as illustrated in FIG. 1B, the frontend device 101 may be or may include a camera 104, a microphone 102, an antenna 103, or the like, or a combination thereof, for generating or receiving a signal. Alternatively or additionally, the frontend device 110 may include a port for plugged in a camera 104, a microphone 102, an antenna 103, or the like, or a combination thereof. In some embodiments, the frontend device may be, or include, or connect with a camera 104 (e.g., a surveillance camera, an in-vehicle camera, a robotic camera). The camera 104 may be zoomed, focused, or rotated. Additionally or alternatively, the camera 104 may also include one or more infrared lights for working in a low-light environment.

The frontend device 101 may receive a control signal from the backend device 105 and perform a corresponding operation. The control signal sent from the backend device 105 to the frontend device may also be referred to as a reverse control signal. For example, the frontend device 101 may include a camera (e.g., the camera 104). Upon receiving a reverse control signal corresponding to a camera zoom operation, the frontend device 101 may cause the camera to zoom or adjust exposure according to the received reverse control signal. Upon receiving a reverse control signal corresponding to an infrared light turning-on operation, the frontend device 101 may cause one or more lights included in the camera to be turned on.

The backend device 105 may receive the video signal sent by the frontend device 101, and/or send a control signal (e.g., a reverse control signal), to the frontend device 101. In some embodiments, the backend device 105 may display and/or store the received video signals. For example, the backend device 105 may include or be connected to a display 106, and a storage device 107. The display 106 may display the received video signals, and the storage device 107 may store the received video signals. The displaying and/or the storing may involve an A/D conversion, a signal encoding, a signal decoding, or the like, or a combination thereof. For example, the backend device 105 may convert the received video signals into data that can be stored and/or displayed and then transmit the data to the storage device 107 and/or display 106.

The backend device 105 may send a control signal to the frontend device 101. For example, the backend device 105 may receive instructions input by a user, e.g, through a keyboard, a controller, or the like, and process the instructions to generate a reverse control signal. The backend device 105 may send the reverse control signal to the frontend device 101 through the transmission controller 108 and/or the single cable 130.

The control signal may be or include an analog signal, a digital signal, or the like, or any combination thereof. The control signal may have at least one voltage level. For example, the control signal may have a high voltage level (or referred to as a first voltage level) and/or a low voltage level (or referred to as a second voltage level). The low voltage level may be smaller than the high voltage level. For example, the low voltage level may be 0V, and the high voltage level may be larger than 0V (e.g., 0.5V, 1V, 2V, etc.).

The single cable 130 may include a first single cable 130-1 connected between the frontend device 101 and the transmission controller 108, and a second single cable 130-2 connected between the transmission controller 108 and the backend device 105. The first single cable 130-1 may receive video signals from the frontend device 110, and transmit the received video signals to the transmission controller 108. The second single cable 130-2 may receive reverse control signals from the backend device 105, and transmit the reverse control signals to the signals processing device 108. The single cable 130 (e.g., the first single cable 130-1 and/or the second single cable 130-2) may refer to a cable configured to transmit signals in at least one direction. For example, the single cable 130 may be or may include a coaxial cable which may transmit video signals in one direction (e.g., from the frontend device 101 to the backend device 105) and tranmit reverse control signals in another direction (e.g., from the backend device 105 to the frontend device 101). Exemplary coaxial cable may include a leaky cable, a triaxial cable, a twin-axial cable, a semi-regid cable, or the like, or any combination thereof.

The transmission controller 108 (e.g., a video extender) may control the transmission of signals (e.g., whether or not to transmit, transmission direction, etc.) between the frontend device 101 and the backend device 105. For example, the transmission controller 108 may receive reverse control signals from the second single cable 130-2, and control the transmission of the received reverse control signals from the second single cable 130-2 to the first single cable 130-1. The transmission controller may include one or more electronic components such as cables, resistances, transistors, amplifiers, inverters, or the like, or any combination thereof. The electronic components may define one or more nodes in the transmission controller. The nodes may have different or same voltage levels. The voltage levels of the nodes may determine the transmission direction of signals (e.g., reverse control signals) in the transmission controller 108, for example, the transmission direction of signals is from nodes having higher voltage levels to those having lower voltage levels, which may further determine the transmission of the signals from the second single cable 130-2 to the first single cable 130-1. For example, the transmission controller may include a node connected to the first single cable 130-1 (or referred to as a first node, or a front node), and a port connected to the second single cable 130-2 (or referred to as Video Output). The transmission controller 108 may control the transmission of reverse control signals between the front node and Video Output by adjusting the voltage of the front mode and/or the Video Output. Specifically, in some embodiments, the transmission controller 108 may adjust said voltage(s) based on the voltage of the received reverse control signal. For example, the transmission controller 108 may adjust the voltage of the front node to be smaller than the voltage of the Video Output, e.g., to be 0V, when the reverse control signal has a high voltage level, to prevent the reverse control signal to be transmitted from the front node back to the Video Output. As another example, the transmission controller may adjust the voltage of the front node to be larger than the voltage of the Video Output, when the reverse control signal has the low voltage level (e.g., 0V).

The front node may be connected to a Video Input which is further connected to the first single cable 130-1 for signal transmission. The Video Input and/or the Video output may include a port, through which the transmission controller 108 may realize its connection with the first single cable 130-1 and/or the second single cable 130-2. Merely by way of example, the Video Input and/or the Video output may include a port for plugging into the first single cable 130-1 and/or the second single cable 130-2.

It may be noticed that, the above description about the MTSP system 100 is only for illustration purposes, and is not intended to limit the present disclosure. It is understandable that, after learning the major concept and the mechanism of the present disclosure, a person of ordinary skill in the art may alter the MTSP system 100 in an uncreative manner. The alteration may include combining and/or splitting modules or units, adding or removing optional modules or units, etc. All such modifications are within the protection scope of the present disclosure. For example, the transmission controller 108 may directly connect to the frontend device 101 (and/or the backend device 105), and the first single cable 130-1 (and/or the second single cable 130-2) may be omitted or be intergrated into the transmission controller 108. Further, the transmission controller may include a port configured to be plugged into the frontend device 101 and/or the backend device 105. As another example, the coaxial transmission system 100 may include at least one first single cable 130-1 (and/or the second single cable 130-2), and/or at least one transmission controller 108.

Merely for illustration purpose, in the following descriptions the present disclosure takes a video extender as an example for the coaxial transmission system 100 to show systems and methods of the above signal transmission control.

Figure 4A:
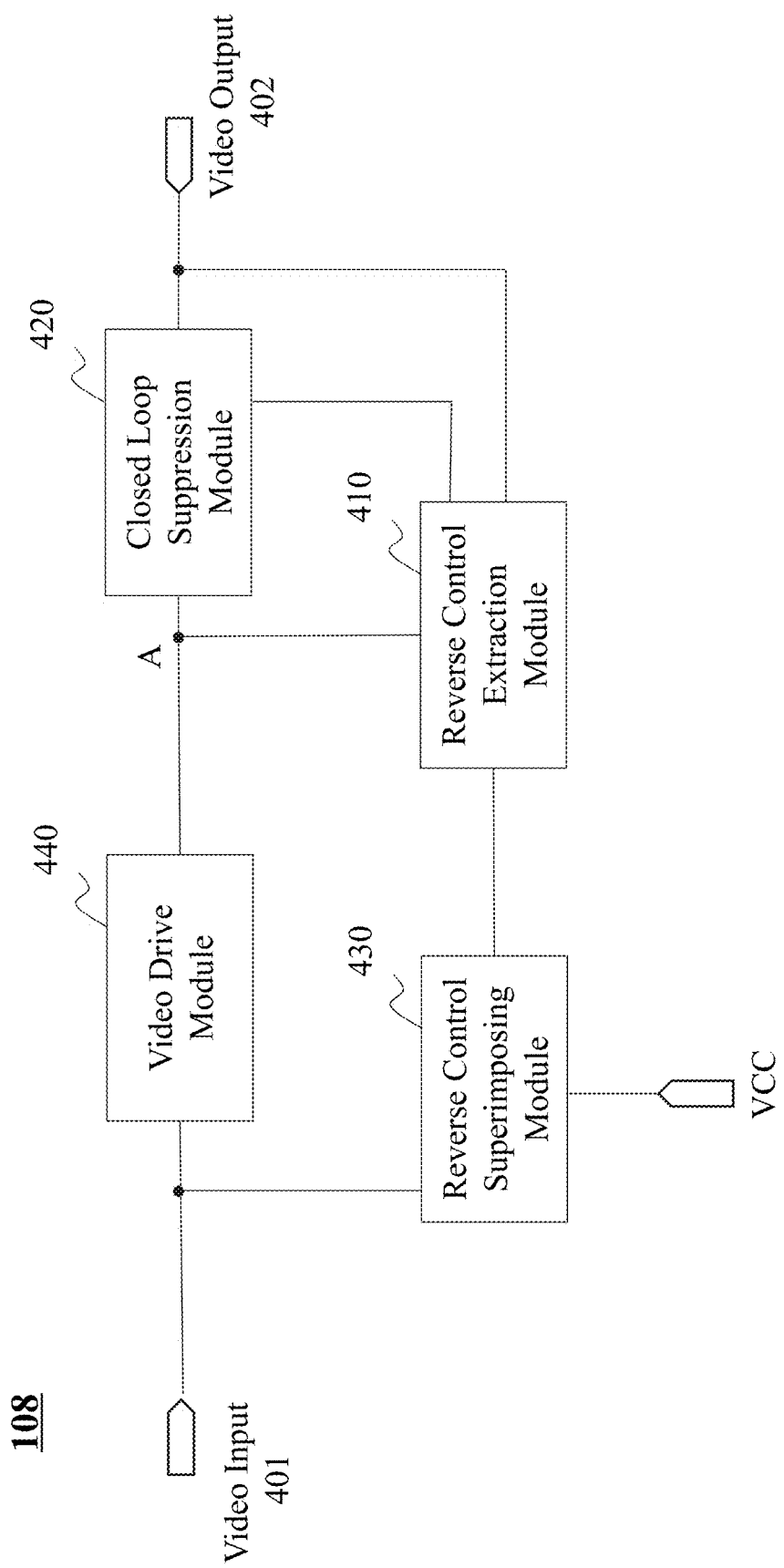
FIG. 4A illustrates a schematic diagram of a video extender according to some embodiments of the present disclosure.

FIG. 4A illustrates a schematic diagram of a video extender according to some embodiments of the present disclosure. As shown in FIG. 4A, the present disclosure provides a video extender including a reverse control extraction module 410, a closed loop suppression module 420, a reverse control superimposing module 430 and a video drive module 440.

The video drive module 440 may be configured to receive a video signal sent by a Video Input 401, amplify the received video signal and transmit the amplified video signal to a first node A.

The closed loop suppression module 420 may be configured to receive the video signal transmitted to the first node A, transmit the received video signal to a Video Output 402, receive a reverse control signal sent by the Video Output 402, and adjust a voltage of the first node A and a voltage of the Video Output 402 according to a voltage of the reverse control signal.

The reverse control extraction module 410 may be configured to receive the voltage of the Video Output 402 and the voltage of the first node A, and output a conduction control signal(s) when the voltage of the Video Output 402 is greater than the voltage of the first node A.

The reverse control superimposing module 430 may be configured to receive the conduction control signal and provide a reference voltage signal of a reference voltage end VCC to the Video Input 401 under the control of the received conduction control signal.

As illustrated above, in the present disclosure, the video extender provided may include the reverse control extraction module 410, the closed loop suppression module 420, the reverse control superimposing module 430 and the video drive module 440. Through the cooperation of the four modules, amplification and transmission of a video signal from the Video Input 401 to the Video Output 402 can be achieved when the video signal is in the non-blanking period, thereby achieving an extended enhancement of the video stream and avoiding false triggering of the non-blanking period. When the video signal is in the blanking period and reverse control is performed, the reverse control signal may be extracted from the Video Output 402 and transmitted to the Video Input 401. The reverse control signal sent to the Video Input 401 may be avoided to be amplified by the video drive module 440 to interfere with the ongoing extract process for the reverse control signal, so that the positive feedback effect is avoided. Therefore, the above video extender provided in the present disclosure may realize transmission of the video signal and extraction of the reverse control signal without the need of adopting a processor having A/D and D/A conversion functions, so that the structure of the video extender may be simplified and the cost may be lowered.

In some embodiments, in the video extender, the voltage of the reference voltage signal may be of a high voltage Vcc, and the voltage amplitude of the reverse control signal is equal to the high voltage Vcc of the reference voltage signal.

Figure 4B:
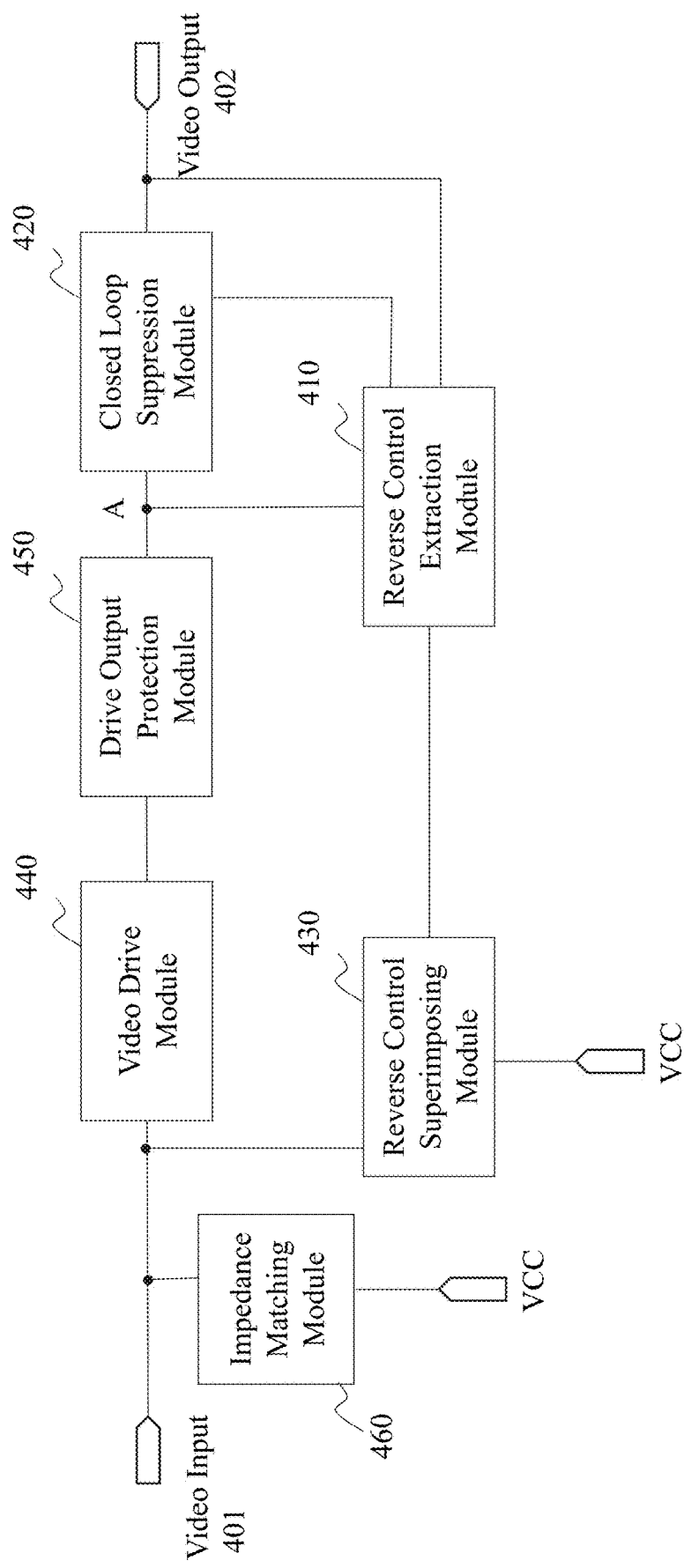
FIG. 4B illustrates a schematic diagram of a video extender according to some embodiments of the present disclosure.

In some embodiments, in order to avoid damage to the video extender when the current output by the video driver in the video drive module 440 is excessively large, as shown in FIG. 4B, the video extender may further include a drive output protection module 450. The video drive module 440 may be connected to the first node A through the drive output protection module 450.

The drive output protection module 450 may be configured to receive the amplified video signal and transmit the amplified video signal to the first node A.

The common image acquisition device at front end may transmit the acquired video signal to the Video Input 401 through a transmission cable. If the impedance connected between the Video Input 401 and the video extender is very small or even there is no impedance, a signal reflection phenomenon may occur at the Video Input 401. Thus, transmission of the video signal may be influenced and an impedance mismatching phenomenon may occur. In order to avoid the impedance mismatching phenomenon, in some embodiments as shown in FIG. 4B, the video extender may further include an impedance matching module 460. The impedance matching module 460 may be connected to the Video Input 401, and configured to achieve the impedance matching.

The present disclosure maybe described in detail with reference to specific embodiments. It should be noted that the embodiments provided may be intended to provide a better explanation of the present disclosure, and not to limit the present disclosure.

In implementation of the above video extender embodiments in the present disclosure, as shown in FIGS. 5A to 5D, the video drive module 440 may include a video driver U.

A drive receiver u1 of the video driver U may be connected to the Video Input 401 so as to receive the video signal sent by the Video Input 401, and a drive output u2 of the video driver U may be connected to the first node A so as to send the amplified video signal to the first node A.

In some embodiments, as shown in FIGS. 6A to 6D, the video extender may further include the drive output protection module 450, and the drive output u2 of the video driver U of the video drive module 440 may be connected to the drive output protection module 450 so as to send the amplified video signal to the drive output protection module 450.

In some embodiments, the video driver may be configured to amplify the received video signal to ensure delay transmission of the video signal.

A video driver may have an intrinsic property, that is, the maximum output current Im. Different video drivers may have different Im. In some embodiments, the maximum output current Im of the video driver needs to be defined according to the real application environment, and is not limited herein. Moreover, the specific structure of the video driver may be different from the video driver in the prior art, and should be understood by those skilled in the art, and is not intended to limit the present disclosure.

The structure described above is only an example of the specific structure of the video drive module 440 in the video extender, and is not intended to limit the structure of the video drive module 440. The video drive module 440 may have other structures known to those skilled in the art and is not limited herein.

In some embodiments, as shown in FIGS. 5A to 6D, the reverse control extraction module 410 may include a comparator P.

A forward input p1 of the comparator P may be connected to the Video Output 402 so as to receive the voltage of the Video Output 402. An inverting input p2 of the comparator P may be connected to the first node A so as to receive the voltage of the first node A. An output p3 of the comparator P may be connected to the reverse control superimposing module 430 and the closed loop suppression module 420 so as to output a conduction control signal thereto.

The comparator may include a circuit which may compare two analog voltage signals to output a voltage signal having a high voltage level or low voltage level. In some embodiments, when the voltage of the forward input of the comparator is greater than the voltage of the inverting input thereof, that is, the voltage of the Video Output 402 is greater than the voltage of the first node, the output of the comparator may output a conduction control signal having a high voltage level. When the voltage of the forward input of the comparator is smaller than or equal to the voltage of the inverting input thereof, that is, the voltage of the Video Output 402 is smaller than or equal to the voltage of the first node, the output of the comparator may output a cut-off control signal having a low voltage level.

The above is only an example of the structure of the reverse control extraction module 410 in the video extender, and is not intended to limit the structure of the reverse control extraction module 410. In some embodiments, the reverse control extraction module 410 may have other structures that known to those skilled in the art.

In some embodiments, as shown in FIGS. 5A, 5B, 6A and 6B, the closed loop suppression module 420 may include a first resistance R1 and a first N-type transistor Qn1.

A first end of the first resistance R1 may be connected to the first node A so as to receive the video signal transmitted to the first node A, and a second end of the first resistance R1 may be connected to the Video Output 402 so as to receive the reverse control signal and transmit the received video signal of the first node A to the Video Output 402. A grid electrode of the first N-type transistor Qn1 may be configured to receive a conduction control signal. A source electrode of the first N-type transistor Qn1 may be connected to a ground terminal GND, and a drain electrode may be connected to the first node A.

Figure 5A:
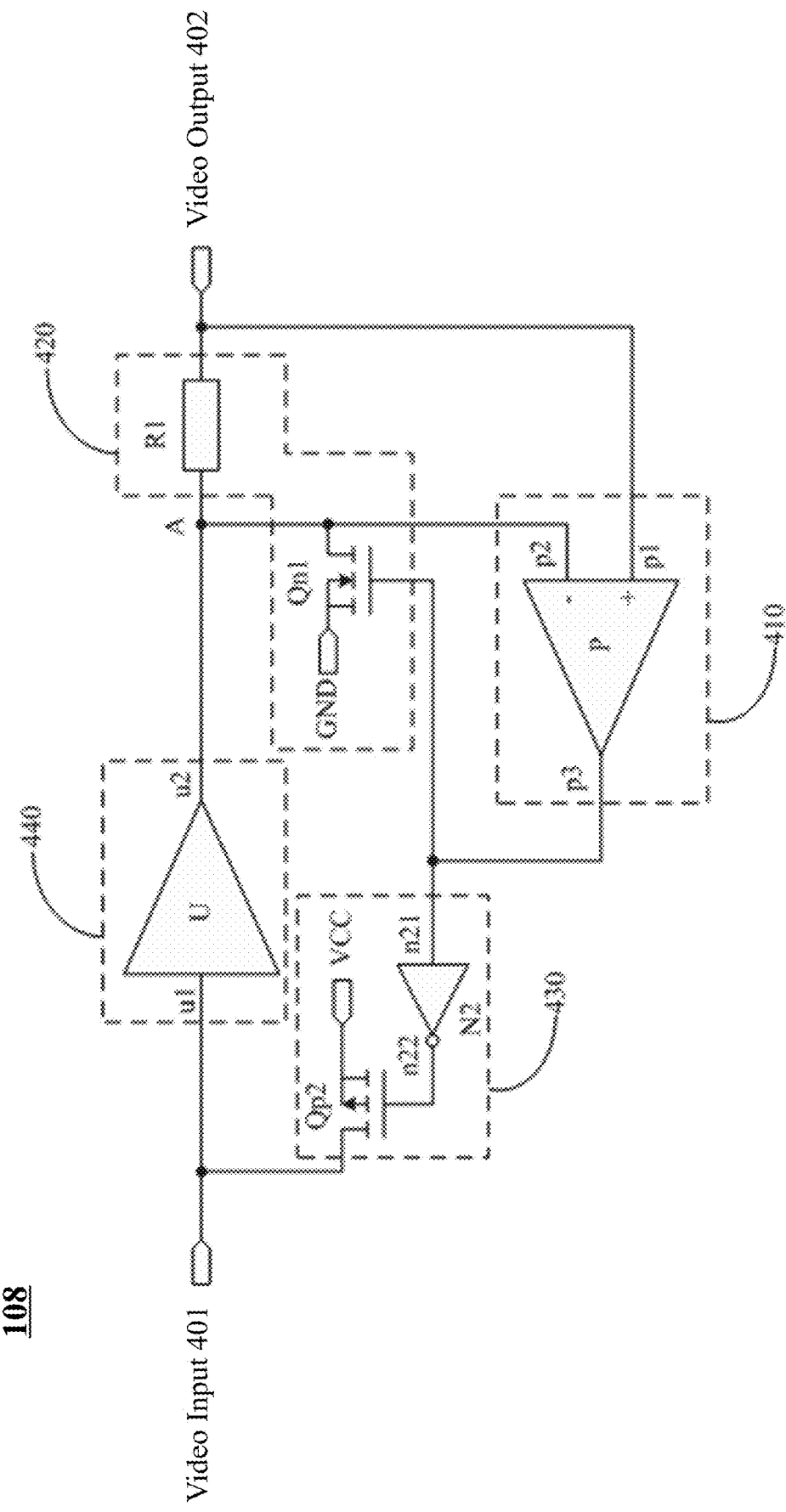
FIG. 5A illustrates a schematic diagram of a video extender according to some embodiments of the present disclosure.
Figure 5B:
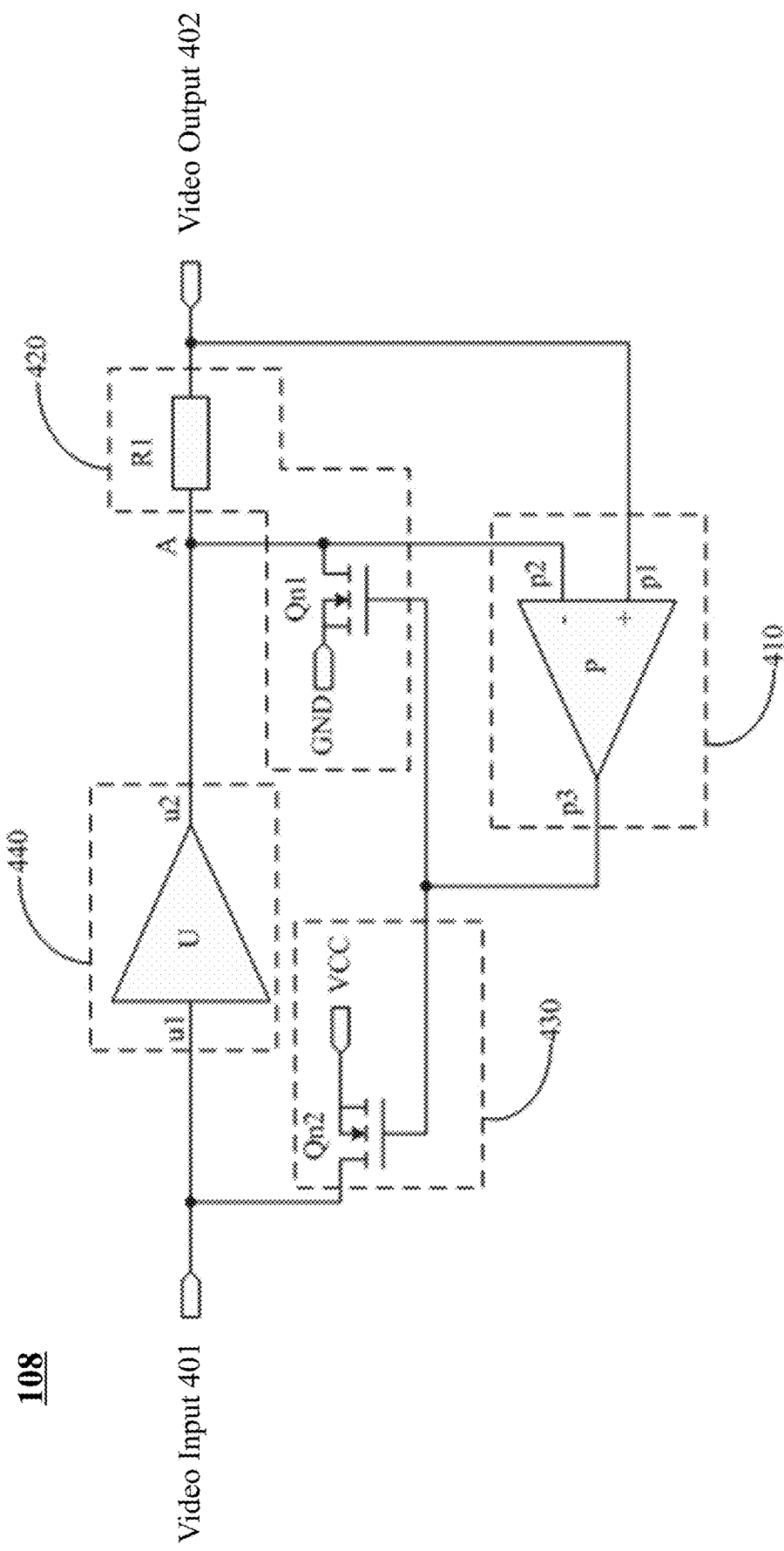
FIG. 5B illustrates a schematic diagram of a video extender according to some embodiments of the present disclosure.
Figure 5C:
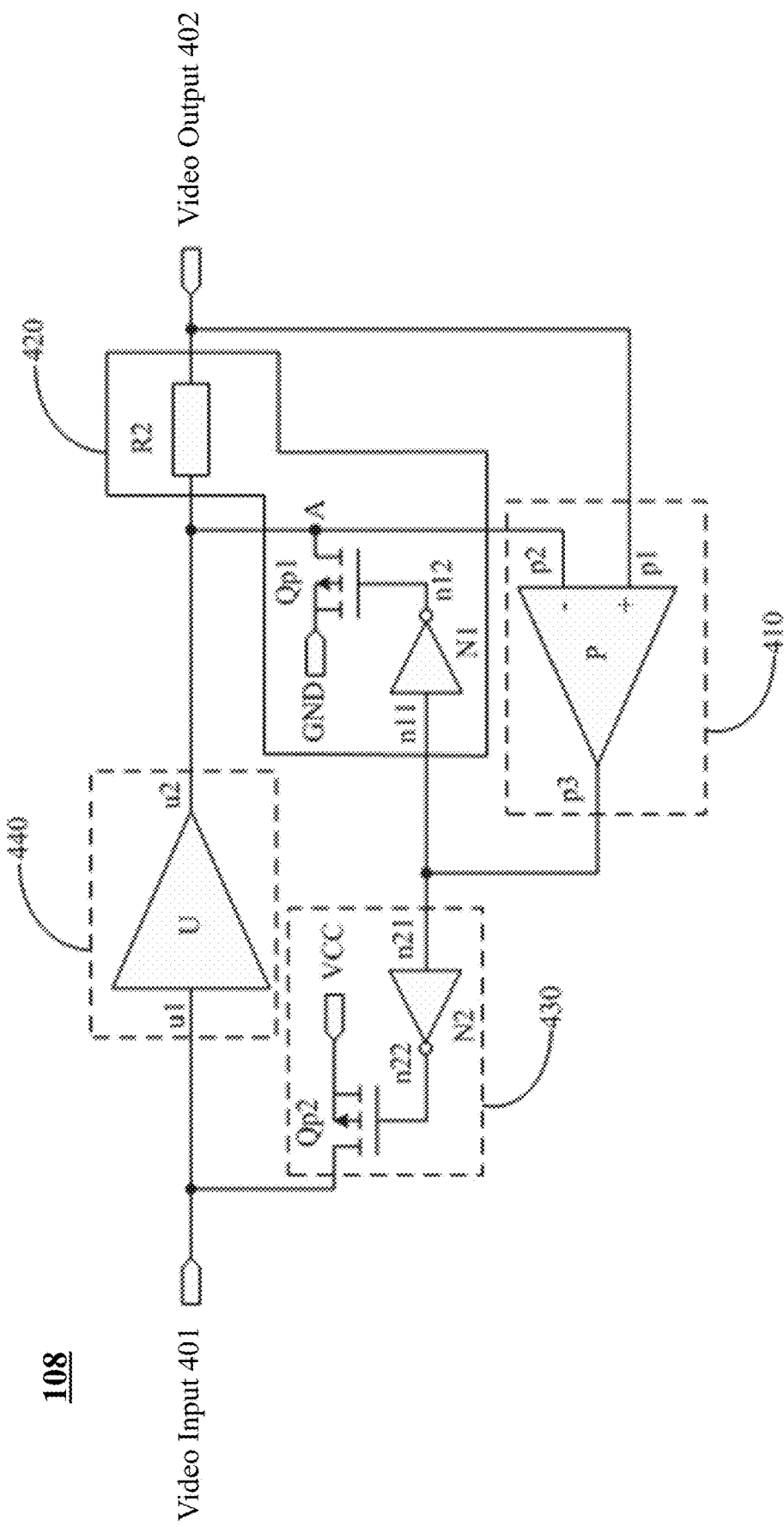
FIG. 5C illustrates a schematic diagram of a video extender according to some embodiments of the present disclosure.
Figure 5D:
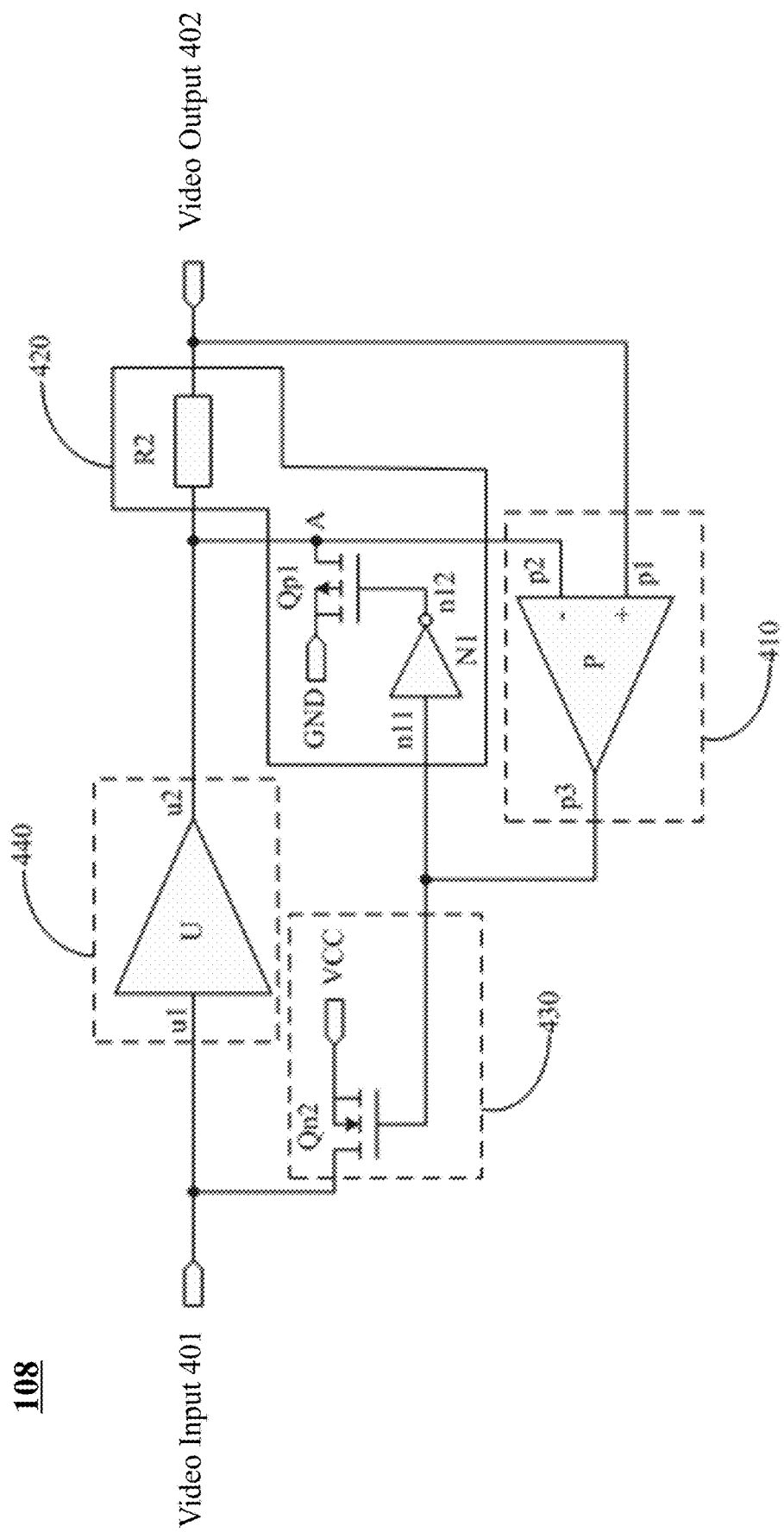
FIG. 5D illustrates a schematic diagram of a video extender according to some embodiments of the present disclosure.

The Video Output 402 may be connected to a video storage device at back end through a coaxial cable so as to transmit the video signal thereto. Since the characteristic impedance Z0 of the coaxial cable is typically 50 ohms or 75 ohms, as shown in FIGS. 5A and 5B, the resistance value r1 of the first resistance may be equal to Z0.

In some embodiments, the grid electrode of the first N-type transistor may be in a conduction state when it receives a conduction control signal having a high voltage level, and the voltage of the ground terminal may be provided to the first node. When the voltage of the signal received by the grid electrode of the first N-type transistor is higher than a first signal voltage threshold (or referred to as a first threshold) of the source electrode thereof, the source electrode may be conducted with the drain electrode. Otherwise, the source electrode and the drain electrode may be cut off. When being in a cut-off state, the first N-type transistor is actually in a high impedance state, which may be regarded as a cut-off state, However, a few currents may flow through the transistor in the high impedance state, so that weak currents may flow through the source electrode and the drain electrode of the first N-type transistor.

In some embodiments, the first threshold may be 0.7V. The first threshold may also be other voltages that can achieve the functions of the present disclosure, and is not limited herein.

In some embodiments, as shown in FIGS. 5A, 5B, 6A and 6B, the first resistance R1 may be connected between the first node A and the Video Output 402 in series. Therefore, when the video signal is in the non-blanking period, a transmission direction of the signal in the video extender is from the Video Input 401 to the Video Output 402, and thus the voltage of the Video Output 402 may be smaller than or equal to the voltage of the first node A. When the video signal is in the blanking period, the video signal sent by the Video Input 401 has a low voltage level. In one respect, when the Video Output 402 does not send a reverse control signal, the transmission direction of the signal in the video extender is from the Video Input 401 to the Video Output 402, and thus the voltage of the Video Output 402 may be smaller than or equal to the voltage of the first node A. In another respect, When the video signal is in the blanking period and the Video Output 402 sends a reverse control signal, the reverse control signal may be sent to the first resistance R1 from the Video Output 402 reversely, and the voltage of the Video Output 402 may be greater than the voltage of the first node A when the reverse control signal has a high voltage, so that the reverse control extraction module 410 may be enabled to output a conduction control signal having a high voltage level, and thus the first N-type transistor Qn1 may be conducted and a voltage signal of the ground terminal GND may be provided to the first node A. Thus, the voltage of the first node A may be ensured to be smaller than the voltage of the Video Output 402. When the reverse control signal has a low voltage, the first node A may have a low voltage, 0V. At this time, the voltage of the Video Output 402 is also a low voltage, 0V, so that the reverse control extraction module 410 may be enabled to output a cut-off control signal having a low voltage level, and thus the first N-type transistor Qn1 may be cut off. However, since the first N-type transistor Qn1 is in a high impedance state, weak currents may flow through the source electrode and the drain electrode of the first N-type transistor Qn1, so that the voltage of the first node A may be enabled to be greater than the voltage of the ground terminal GND. Thus, the voltage of the first node A may be enabled to be greater than the voltage of the Video Output 402.

Alternatively, in some embodiments, as shown in FIGS. 5C, 5D, 6C and 6D, the closed loop suppression module 420 may include a second resistance R2, a first P-type transistor Qp1 and a first inverter N1.

A first end of the second resistance R2 may be connected to the first node A so as to receive the video signal transmitted to the first node A. A second end of the second resistance R2 may be connected to the Video Output 402 so as to receive the reverse control signal therefrom and transmit the received video signal of the first node A thereto. An input n11 of the first inverter N1 may be configured to receive a conduction control signal. An output of the first inverter N1 may be connected to a grid electrode of the first P-type transistor Qp1. A source electrode of the first P-type transistor Qp1 may be connected to the ground terminal GND, and a drain electrode may be connected to the first node A.

The Video Output 402 may be connected to a video storage device at back end through a coaxial cable so as to transmit the video signal thereto. Since the characteristic impedance Z0 of the coaxial cable is typically 50 ohms or 75 ohms, when the drive output protection module 450 includes a third resistance, the resistance value r2 of the second resistance may be equal to Z0.

The first P-type transistor may be in a conduction state when the grid electrode of the first P-type transistor receives a conduction control signal having a low voltage level, and the voltage of the ground terminal may be provided to the first node. When the voltage of the signal received by the grid electrode of the first P-type transistor is lower than a second signal voltage threshold (or referred to as a second threshold) of the source electrode thereof, the source electrode may be conducted with the drain electrode. Otherwise, the source electrode and the drain electrode may be cut off. When being in a cut-off state, the first P-type transistor is actually in a high impedance state. However, a few currents may flow through the transistor in the high impedance state, so that weak currents may flow through the source electrode and the drain electrode of the first P-type transistor.

In some embodiments, the second threshold may be 0.7V. The second threshold may also be other voltages that can achieve the functions of the present disclosure, and is not limited herein.

In some embodiments, when a voltage signal having a high voltage level is output to the input of the first inverter, the output of the first inverter may output a voltage signal having a low voltage level. When a voltage signal having a low voltage level is input at the input of the first inverter, the output of the first inverter may output a voltage signal having a high voltage level.

In some embodiments, as shown in FIGS. 5C, 5D, 6C and 6D, the second resistance R2 may be connected between the first node A and the Video Output 402 in series. When the video signal is in the non-blanking period, a transmission direction of the video signal is from the Video Input 401 to the Video Output 402, and the voltage of the Video Output 402 may be smaller than or equal to the voltage of the first node A. When the video is in the blanking period, the video signal sent by the Video Input 401 has a low voltage level When the video is in the blanking period, and the Video Output 402 does not send a reverse control signal, the transmission direction of a video signal in the video extender is from the Video Input 401 to the Video Output 402, and the voltage of the Video Output 402 may be smaller than or equal to the voltage of the first node A. When the video signal is in the blanking period and the Video Output 402 sends a reverse control signal, the reverse control signal may be sent to the second resistance R2 from the Video Output 402, and the voltage of the Video Output 402 may be greater than the voltage of the first node A when the voltage of the reverse control signal is a high voltage, so that the reverse control extraction module 410 may be enabled to output a conduction control signal having a high voltage level. When a conduction control signal having a high voltage level is input to the input n11 of the first inverter N1, the output n12 thereof may output a voltage signal having a low voltage level to the grid electrode of the first P-type transistor Qp1, so that the first P-type transistor Qp1 may be conducted and a voltage signal of the ground terminal GND may be provided to the first node A, and thereby the voltage of the first node A may be ensured to be smaller than the voltage of the Video Output 402 all the time. When the voltage of the reverse control signal is a low voltage, the voltage of the first node A is a low voltage, 0V, and at this time, the voltage of the Video Output 402 is also a low voltage, 0V, so that the reverse control extraction module 410 may be enabled to output a cut-off control signal having a low voltage level, and thus a voltage signal having a low voltage level is input at the input n11 of the first inverter N1 and thus the output n12 thereof may output a voltage signal having a high voltage level to the grid electrode of the first P-type transistor Qp1, so as to cut off the first P-type transistor Qp1. However, since the first P-type transistor Qp1 is in a high impedance state, weak currents may flow through the source electrode and the drain electrode of the first P-type transistor Qp1, so that the voltage of the first node A may be enabled to be greater than the voltage of the ground terminal GND, and thus the voltage of the first node A may be enabled to be greater than the voltage of the Video Output 402.

The above is only an example of the specific structure of the closed loop suppression module 420 in the video extender, which is not intended to be limiting. The closed loop suppression module 420 may have other structures known to those skilled in the art and is not limited herein.

In some embodiments, as shown in FIGS. 5B, 5D, 6B and 6D, the reverse control superimposing module 430 may include a second N-type transistor Qn2.

A grid electrode of the second N-type transistor Qn2 may be configured to receive a conduction control signal, a source electrode of the second N-type transistor Qn2 may be connected to the reference voltage end VCC, and a drain electrode of the second N-type transistor Qn2 may be connected to the Video Input 401 so as to provide the reference voltage signal to the Video Input 401.

The second N-type transistor may be in a conduction state when the grid electrode of the second N-type transistor receiving a voltage signal having a high voltage level. When the second N-type transistor is in a conduction state, the reference voltage signal may be provided to the Video Input 401. In practical application, when the voltage of the signal of the grid electrode of the second N-type transistor is higher than a fourth threshold of the voltage of the signal of the source electrode, the source electrode and the drain electrode are in a short circuit state. Otherwise, the source electrode and the drain electrode are cut off. However, when being in a cut-off state, the second N-type transistor is actually in a high impedance state, which may be regarded as a cut-off state. But in fact, a few currents may flow through the transistor (e.g., the source electrode and the drain electrode of the second N-type transistor) in the high impedance state.

In some embodiments, the fourth threshold is 0.7V. Of course, the fourth threshold may also be other voltages that can achieve the functions of the present disclosure, and is not limited herein.

In some embodiments, as shown in FIGS. 5A, 5C, 6A and 6C, the reverse control superimposing module 430 may include a second P-type transistor Qp2 and a second inverter N2.

An input n21 of the second inverter N2 may be configured to receive a conduction control signal, and an output n22 may be connected to a grid electrode of the second P-type transistor Qp2.

A source electrode of the second P-type transistor Qp2 may be connected to the reference voltage end VCC, and a drain electrode of the second P-type transistor Qp2 may be connected to the Video Input 401 to provide the reference voltage signal to the Video Input 401.

In specific implementing, when the input of the second inverter is input a conduction control signal having a high voltage level, the output thereof may output a voltage signal having a low voltage level. When the input of the second inverter is input a cut-off control signal having a low voltage level, the output thereof may output a voltage signal having a high voltage level.

The second P-type transistor may be in a conduction state when the grid electrode of the second P-type transistor receives a voltage signal having a low voltage level. When the second P-type transistor is in a conduction state, the reference voltage signal may be provided to the Video Input 401. In practical application, when the voltage of the signal of the grid electrode of the second P-type transistor is lower than a third threshold of the voltage of the signal of the source electrode thereof, the source electrode and the drain electrode are in a short circuit state. Otherwise, the source electrode and the drain electrode are cut off. When being in a cut-off state, the second P-type transistor is actually in a high impedance state, which may be regarded as a cut-off state. But in fact, weak currents may flow through the transistor (e.g., the source electrode and the drain electrode) in the high impedance state.

In some embodiments, the third threshold is 0.7V. Of course, the third threshold may also be other voltages that can achieve the functions of the present disclosure, and is not limited herein.

The above is only an example of the structure of the reverse control superimposing module 430, which is not intended to be limiting. The reverse control superimposing module 430 may have other structures known to those skilled in the art and is not limited herein.

In some embodiments, as shown in FIGS. 6A to 6D, the drive output protection module 450 may include a third resistance R3.

A first end of the third resistance R3 may be connected to the video drive module 440 so as to receive the amplified video signal, and a second end of the third resistance R3 may be connected to the first node A so as to transmit the amplified video signal to the first node A.

Since the video driver in the video drive module 440 has a maximum output current Im, the resistance value r3 of the third resistance may need to satisfy Formula $$\frac{Vcc}{r3} < \text{Im},$$

so as to restrict the current of the video driver in the video drive module 440, and to not allow the video driver in the video drive module 440 to output an excessively large current, through which a damage to the video extender that may be caused by an excessively large current output by the video drive module 440, may be avoided. Further, when the closed loop suppression module 420 includes the first resistance, the resistance value r1 of the first resistance and the resistance value r3 of the third resistance may satisfy a relationship: r1+r3=Z0. When the closed loop suppression module 420 further includes the second resistance, the resistance value r2 of the second resistance and the resistance value r3 of the third resistance may satisfy a relationship: r2+r3=Z0.

The above is only an example of the structure of the drive output protection module 450 in the video extender, which is not intended to be limiting. The drive output protection module 450 may have other structures known to those skilled in the art and is not limited herein.

In some embodiments, as shown in FIGS. 6A to 6D, the impedance matching module 460 may include a matching resistance Rn.

A first end of the matching resistance Rn may be connected to the Video Input 401, and a second end of the matching resistance Rn may be connected to the ground terminal GND.

An image acquisition device at front end (not shown) may transmit the acquired video signal to the Video Input 401 through a transmission cable. If the impedance connected to the Video Input 401 in the video extender is very small or even there is no impedance, a signal reflection phenomenon may occur in the video signal at the Video Input 401, so that transmission of the video signal may be influenced and an impedance mismatching phenomenon may occur. Therefore, in order to avoid the impedance mismatching phenomenon, the impedance of the matching resistance may be equal to the characteristic impedance of the transmission cable and both have a same phase.

Hereinafter, the specific work of the above video extender provided in the embodiment of the present disclosure will be described below with reference to the signal timing diagram by taking the video extenders shown in FIGS. 6A to 6D as examples, respectively. Hereinafter, description will be made by taking the following as examples: the voltage amplitude of the reverse control signal is equal to the voltage of the reference voltage signal, the low voltage of the reverse control signal is equal to the low voltage of a video signal which is in the blanking period, and the voltage of the video signal in the blanking period is a low voltage, 0V.

First Embodiment

Figure 6A:
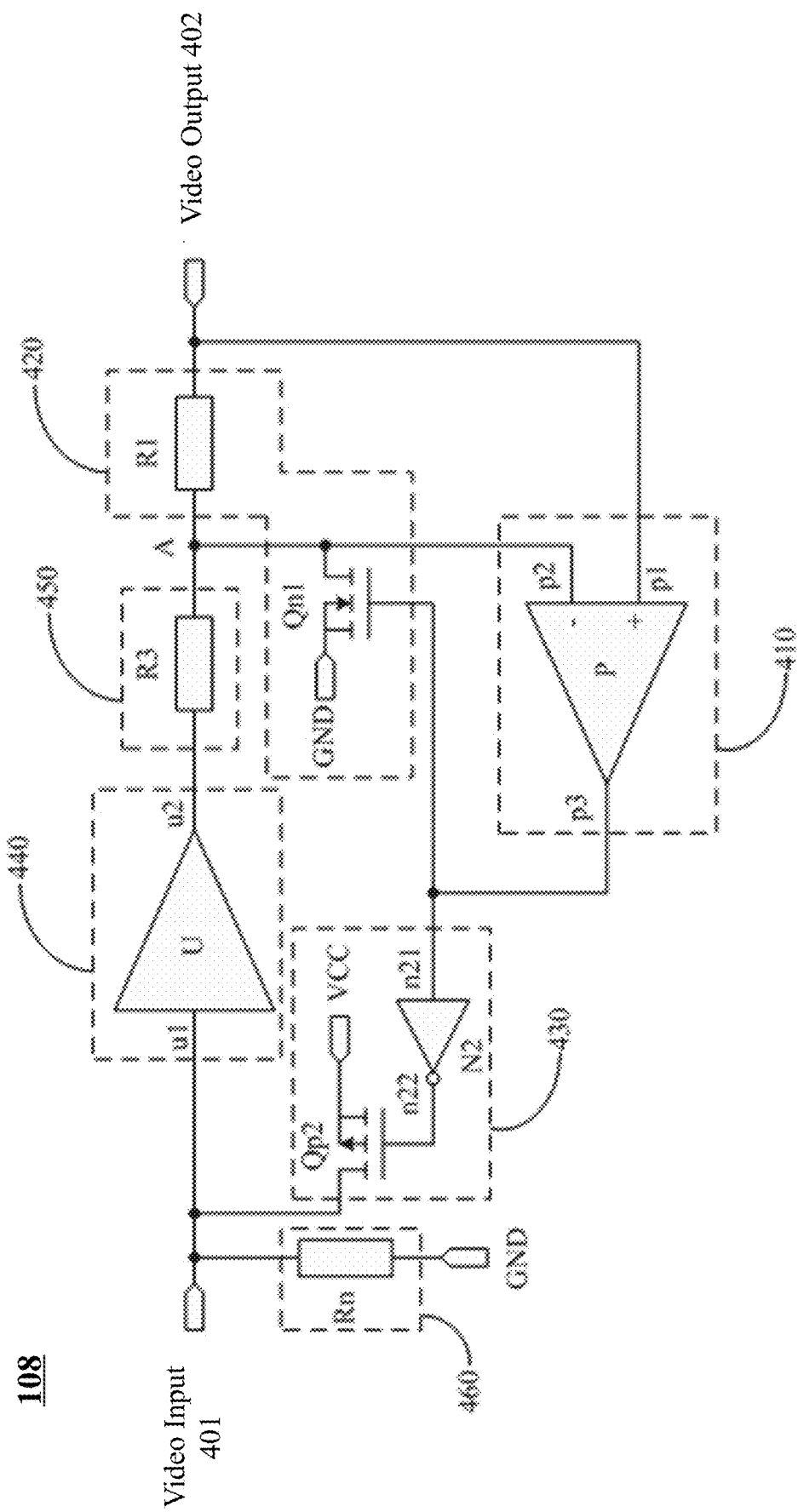
FIG. 6A illustrates a schematic diagram of a video extender according to some embodiments of the present disclosure.
Figure 7:
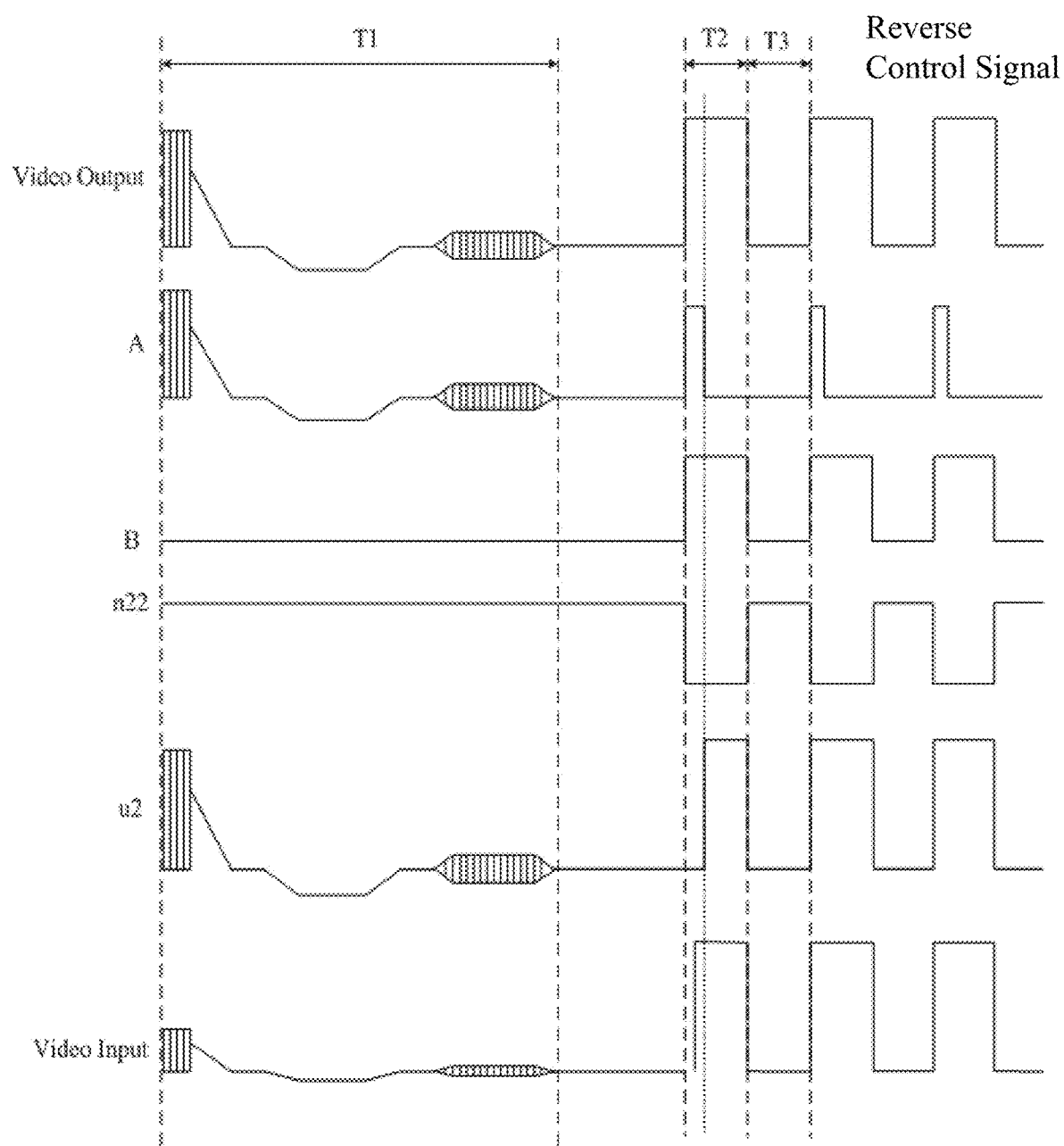
FIG. 7 illustrates an exemplary signal timing diagram in a video extender according to some embodiments of the present disclosure.

Description will be made while taking the specific structure of the video extender shown in FIG. 6A as example. The corresponding signal timing diagram in the video extender is shown in FIG. 7. As illustrated in FIG. 7, when the video signal is in the non-blanking period, transmission of the video signal is performed. When the video signal is in the blanking period, transmission of the reverse control signal is performed. When the reverse control signal is transmitted, there may be three stages including a first stage T1, a second stage T2 and a third stage T3. The first stage T1 is a stage in which the video signal is in the non-blanking period and the second stage T2 is a stage in which the reverse control signal is sent.

In the first stage T1 where the video signal is in the non-blanking period, the Video Input 401 may send the video signal, and the video driver U may receive the video signal through the drive receiver u1, amplify the same, and then output the amplified video signal through the drive output u2. The amplified video signal may be transmitted to the first node A through the third resistance R3, and further transmitted to the Video Output 402 through the first resistance R1, so that the function of transmitting the video signal in the non-blanking period is achieved. The matching resistance Rn may achieve a function of resistance matching.

Since the transmission direction of the video signal in the non-blanking period is from the Video Input 401 to the Video Output 402, the voltage of the first node A may be equal to or greater than the voltage of the Video Output 402, thus the comparator P may be enabled to output a cut-off control signal having a low voltage level, and the output n22 of the second inverter N2 may be enabled to output a voltage signal having a high voltage level. The cut-off control signal having the low voltage level and the voltage signal having the high voltage level may cause the first N-type transistor Qn1 and the second P-type transistor Qp2 to be in a cut-off state, and thus the transmission process of the video signal in the non-blanking period is not influenced.

In the second stage T2, the Video Output 402 may send the reverse control signal to the first resistance R1. The voltage of the reverse control signal may be a high voltage and the voltage amplitude equals to Vcc, so that the voltage of the Video Output 402 is Vcc. The first resistance R1 and the third resistance R3 can achieve the function of impedance matching. Since the video signal in the blanking period may arrive at the drive output u2 of the video driver U after passing through the video driver U, the voltage of the drive output u2 may be a low voltage and may be 0V. Since the first resistance R1 and the third resistance R3 are connected between the output u2 of the video driver U and the Video Output 402 in series, the voltage of the first node A $$Vcc * \frac{r3}{r1+r3}.$$

may be Since the voltage of the Video Output 402 is Vcc, the voltage of the Video Output 402 may thus be greater than the voltage of the first node A. Thus, the voltage of the forward input p1 of the comparator P may be greater than the voltage of the inverting input p2, the output p3 of the comparator P may output a conduction control signal having a high voltage level. Therefore, the voltage of the output n22 of the second inverter N2 may be a voltage signal having a low voltage level, so that the second P-type transistor Qp2 is conducted and the voltage Vcc of the reference voltage end VCC may be provided to the Video Input 401. Thus, the voltage Vcc representing the high voltage of the reverse control signal is mixed with the video signal in the blanking period through the Video Input 401, so as to transmit the mixed one to the image acquisition device at front end (not shown). Since the Video Input 401 is connected to the drive receiver u1 of the video driver U, the video driver U may also amplify the voltage Vcc representing the high voltage of the reverse control signal mixed with the video signal in the blanking period and transmit the amplified one to the drive output u2. However, since the first N-type transistor Qn1 is conducted under the control of the conduction control signal and the voltage of the ground terminal GND is provided to the first node A, the voltage of the first node A is 0V. Since the voltage of the Video Output 402 is Vcc, a state where the voltage of the Video Output 402 is greater than the voltage of the first node A may be maintained all the time, so that the output p3 of the comparator P may be enabled to output a conduction control signal having a high voltage level all the time, and the first N-type transistor Qn1 may be ensured to be conducted and the voltage of the ground terminal GND to be provided to the first node A, and thus the voltage of the first node A is 0V, and thereby the video extender can be ensured to work normally when the voltage of the reverse control signal is a high voltage.

Then, the Video Output 402 may send the reverse control signal having a low voltage of 0V to the first resistance R1. The first resistance R1 and the third resistance R3 may achieve the function of impedance matching. Therefore, the voltage of the Video Output 402 is 0V, and the voltage of the Video Output 402 is smaller than or equal to the voltage of the first node A, so that the output p3 of the comparator P may output a cut-off control signal having a low voltage level. Therefore, the first N-type transistor Qn1 may be cut off, the voltage of the output n22 of the second inverter N2 has a voltage signal having a low voltage level, and the second P-type transistor Qp2 may be cut off. Since the voltage of the Video Input 401 equals to the voltage of the video signal in the blanking period, the voltage (0V), the voltage of the video signal in the blanking period (0V) may be taken as the low voltage of the reverse control signal, so as to transmit the reverse control signal to the image acquisition device at front end (not shown).

After the second stage T2 is completed, the work process of the second stage T2 may be performed repeatedly until the Video Output 402 stops sending reverse control signals.

In the first embodiment, the time period in which the voltage of the first node A may depend on the response delay of the comparator and the first N-type transistor.

Second Embodiment

Figure 6B:
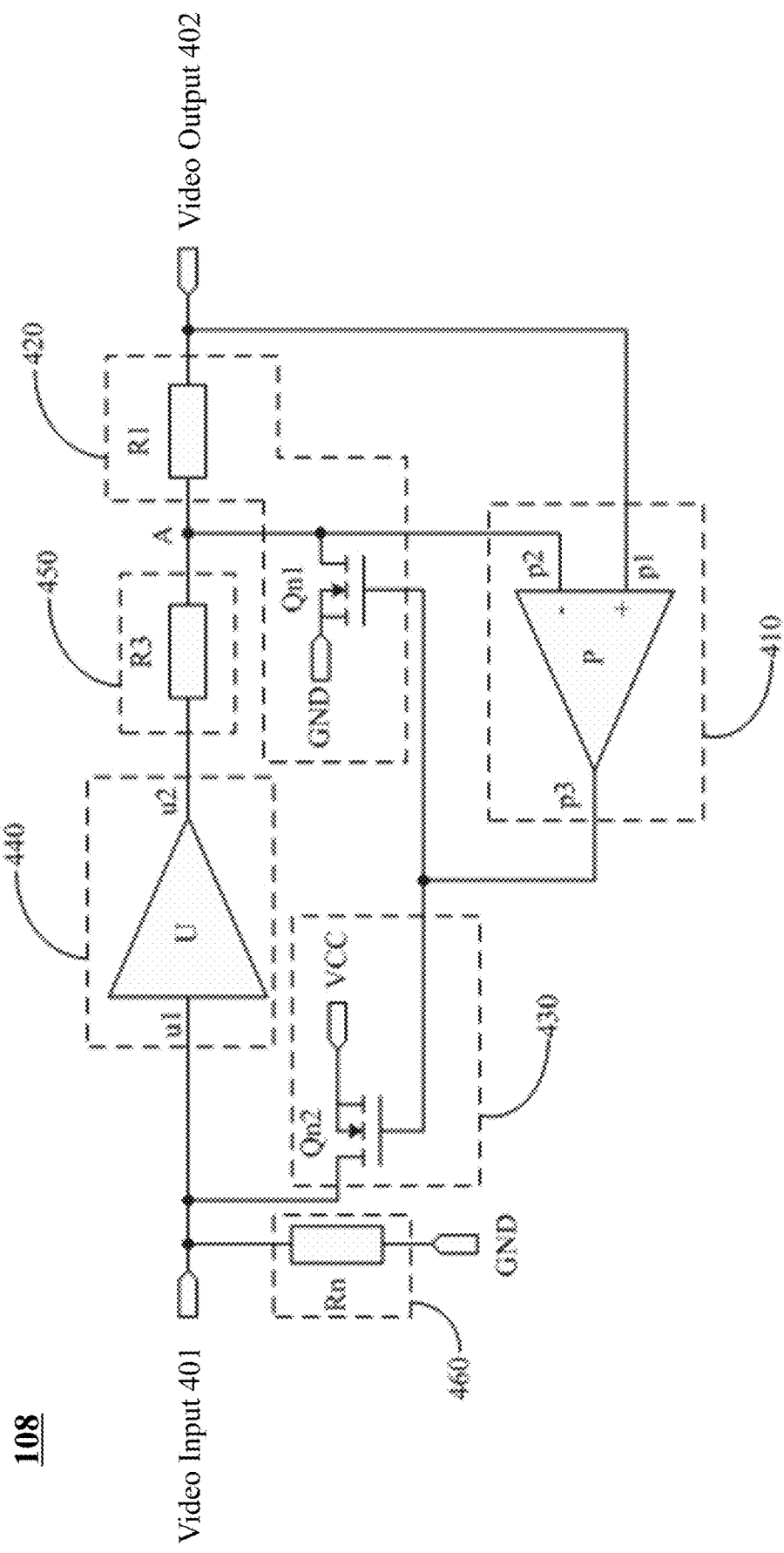
FIG. 6B illustrates a schematic diagram of a video extender according to some embodiments of the present disclosure.

Description will be made while taking the specific structure of the video extender shown in FIG. 6B as example. The corresponding signal timing diagram of input and output is shown in FIG. 7. As illustrated in FIG. 7, when the video signal is in the non-blanking period, transmission of the video signal is performed. When the video signal is in the blanking period, transmission of the reverse control signal is performed. When the reverse control signal is transmitted, two stages, a first stage T1 and a second stage T2 shown in FIG. 7 will be described in detail as examples, wherein the first stage T1 is a stage in which the video signal is in the non-blanking period and the second stage T2 is a stage in which the reverse control signal is sent.

In the first stage T1 when the video signal is in the non-blanking period, the Video Input 401 may send a video signal, and the video driver U may receive the video signal through the drive receiver u1, amplify the same, and then output the amplified video signal through the drive output u2. The amplified video signal may be transmitted to the first node A through the third resistance R3, and then transmitted to the Video Output 402 through the first resistance R1, so that the function of transmitting the video signal in the non-blanking period is achieved. The matching resistance Rn may achieve a function of resistance matching. Since the transmission direction of the video signal in the non-blanking period is from the Video Input 401 to the Video Output 402, the voltage of the first node A may be equal to or greater than the voltage of the Video Output 402, and the comparator P may be enabled to output a cut-off control signal having a low voltage level. As a result, the first N-type transistor Qn1 and the second N-type transistor Qn2 may be enabled to be in a cut-off state, and thus the transmission process of the video signal in the non-blanking period is not influenced.

In the second stage T2, the Video Output 402 may send the reverse control signal to the first resistance R1. The voltage of the reverse control signal is a high voltage and the voltage amplitude equals to Vcc. Thus, the voltage of the Video Output 402 is Vcc. The first resistance R1 and the third resistance R3 can achieve the function of impedance matching. Since the video signal in the blanking period may arrive at the drive output u2 of the video driver U after passing through the video driver U, the voltage of the drive output u2 is a low voltage and is 0V. Since the first resistance R1 and the third resistance R3 are connected between the output u2 of the video driver U and the Video Output 402 in series, the voltage of the first node A is $$V_{CC} * \frac{r3}{r1+r3}.$$

Since the voltage of the Video Output 402 is Vcc, the voltage of the first node A is $$V_{CC} * \frac{r3}{r1+r3},$$

the voltage of the Video Output 402 is thus greater than the voltage of the first node A. Thus, the voltage of the forward input p1 of the comparator P is greater than the voltage of the inverting input p2, the output p3 of the comparator P may have a conduction control signal having a high voltage level. Therefore, the second N-type transistor Qn2 is conducted and the voltage Vcc of the reference voltage end VCC may be provided to the Video Input 401, and thus the voltage Vcc representing the high voltage of the reverse control signal is mixed with the video signal in the blanking period through the Video Input 401, so as to transmit the mixed one to the image acquisition device at front end. Since the Video Input 401 is connected to the drive receiver u1 of the video driver U, the video driver U may also amplify the voltage Vcc representing the high voltage of the reverse control signal mixed with the video signal in the blanking period and transmit the amplified one to the drive output u2. However, since the first N-type transistor Qn1 is conducted under the control of the conduction control signal and the voltage of the ground terminal GND is provided to the first node A, the voltage of the first node A is 0V. Since the voltage of the Video Output 402 is Vcc, a state where the voltage of the Video Output 402 is greater than the voltage of the first node A may be maintained all the time, so that the output p3 of the comparator P may be enabled to output a conduction control signal having a high voltage level all the time, and the first N-type transistor Qn1 may be ensured to be conducted and the voltage of the ground terminal GND is provided to the first node A, and thus the voltage of the first node A is 0V, and thereby the video extender can be ensured to work normally when the voltage of the reverse control signal is a high voltage.

Then, the Video Output 402 may send the reverse control signal having a low voltage of 0V to the first resistance R1. The first resistance R1 and the third resistance R3 can achieve the function of impedance matching. Therefore, the voltage of the Video Output 402 is 0V, and the voltage of the Video Output 402 is smaller than or equal to the voltage of the first node A. As a result, the output p3 of the comparator P may output a cut-off control signal having a low voltage level. Therefore, the first N-type transistor Qn1 and the second N-type transistor Qn2 may be both cut off. Since the voltage of the Video Input 401 equals to the voltage of the video signal in the blanking period (0V), the voltage, of the video signal in the blanking period (0V) may be taken as the low voltage of the reverse control signal, so as to transmit the reverse control signal to the image acquisition device at front end (not shown).

After the second stage T2 is completed, the work process of the second stage T2 may be performed repeatedly until the Video Output 402 stops sending reverse control signals.

In the second embodiment, the time period in which the voltage of the first node A is may depend on the response delay of the comparator and the first N-type transistor.

Third Embodiment

Figure 6C:
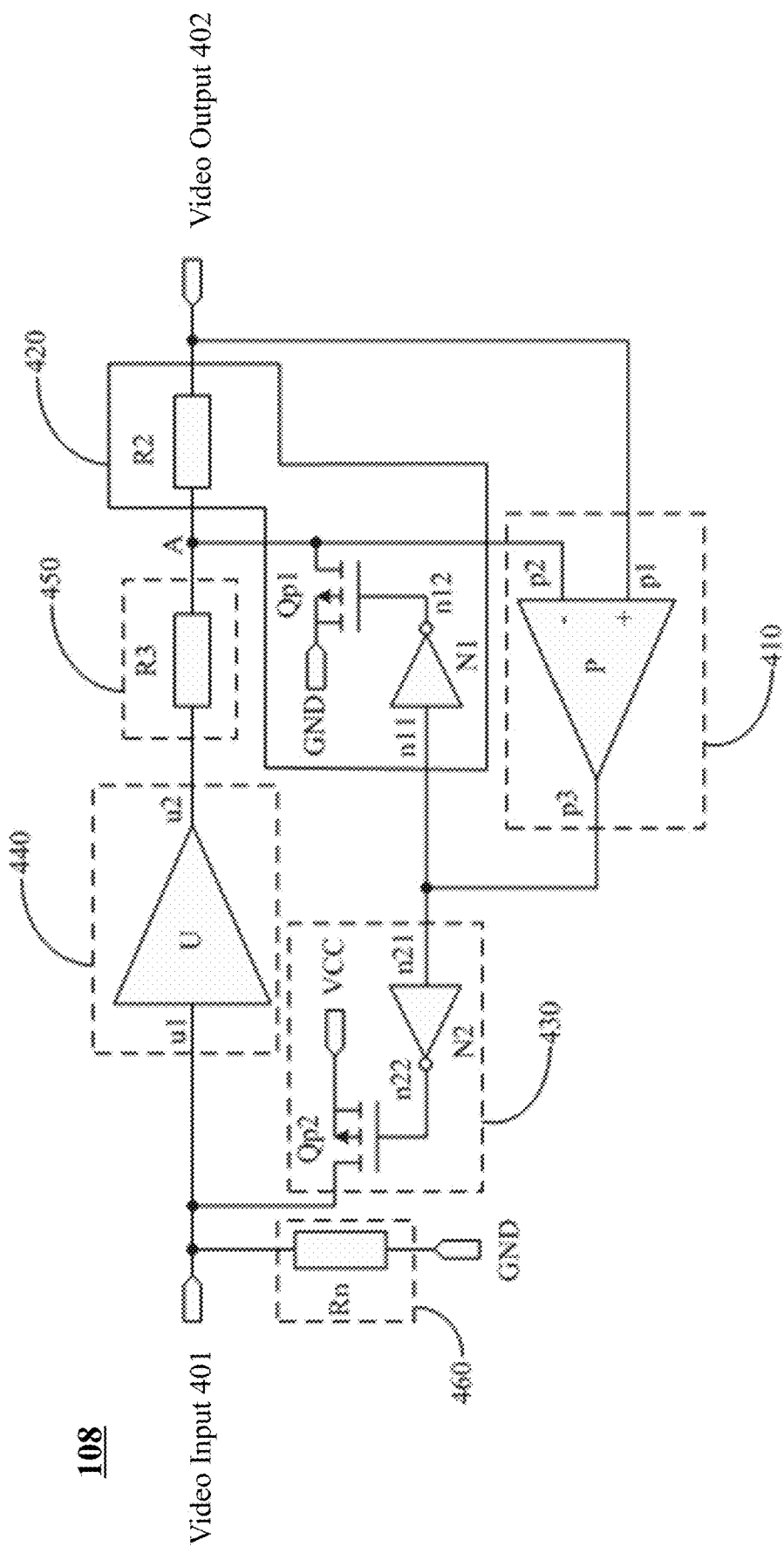
FIG. 6C illustrates a schematic diagram of a video extender according to some embodiments of the present disclosure.

Description will be made while taking the specific structure of the video extender shown in FIG. 6C as example. The corresponding signal timing diagram of input and output is shown in FIG. 7. As illustrated in FIG. 7, when the video signal is in the non-blanking period, transmission of the video signal is performed. When the video signal is in the blanking period, transmission of the reverse control signal is performed. When the reverse control signal is transmitted, two stages, a first stage T1 and a second stage T2 shown in FIG. 7 will be described in detail as examples, wherein the first stage T1 is a stage in which the video signal is in the non-blanking period and the second stage T2 is a stage in which the reverse control signal is sent.

In the first stage T1 when the video signal is in the non-blanking period, the Video Input 401 may send a video signal, and the video driver U may receive the video signal through the drive receiver u1, amplify the same, and then output the amplified video signal through the drive output u2. The amplified video signal may be transmitted to the first node A through the third resistance R3, and then transmitted to the Video Output 402 through the second resistance R2, so that the function of transmitting the video signal in the non-blanking period is achieved. The matching resistance Rn may achieve a function of resistance matching. Since the transmission direction of the video signal in the non-blanking period is from the Video Input 401 to the Video Output 402, the voltage of the first node A may be equal to or greater than the voltage of the Video Output 402, the comparator P may be enabled to output a cut-off control signal having a low voltage level, and the output n12 of the first inverter N1 may be enabled to output a voltage signal having a high voltage level, and the output n22 of the second inverter N2 may be enabled to output a voltage signal having a high voltage level, so that the first P-type transistor Qp1 and the second P-type transistor Qp2 may be enabled to be in a cut-off state, and thus the transmission process of the video signal in the non-blanking period is not influenced.

In the second stage T2, the Video Output 402 may send the reverse control signal to the second resistance R2, and the voltage of the reverse control signal is a high voltage and the voltage amplitude equals to Vcc, so that the voltage of the Video Output 402 is Vcc, wherein the second resistance R2 and the third resistance R3 can achieve the function of impedance matching. Since the video signal in the blanking period may arrive at the drive output u2 of the video driver U after passing through the video driver U, the voltage of the drive output u2 is a low voltage and is 0V. Since the second resistance R2 and the third resistance R3 are connected between the output u2 of the video driver U and the Video Output 402 in series, the voltage of the first node A is $$Vcc * \frac{r3}{r2+r3}.$$

Since the voltage of the Video Output 402 is Vcc, the voltage of the first node A is $$Vcc * \frac{r3}{r2+r3},$$

the voltage or the Video Output 402 is thus greater than the voltage of the first node A. Thus, the voltage of the forward input p1 of the comparator P is greater than the voltage of the inverting input p2, the output p3 of the comparator P may have a conduction control signal having a high voltage level. Therefore, the voltage of the output n12 of the first inverter N1 is a voltage signal having a low voltage level, and the voltage of the output n22 of the second inverter N2 is a voltage signal having a low voltage level. Since the voltage of the output n22 of the second inverter N2 is a voltage signal having a low voltage level, the second P-type transistor Qp2 is conducted and the voltage Vcc of the reference voltage end VCC may be provided to the Video Input 401, and thus the voltage Vcc representing the high voltage of the reverse control signal is mixed with the video signal in the blanking period through the Video Input 401, so as to transmit the mixed one to the image acquisition device at front end. Since the Video Input 401 is connected to the drive receiver u1 of the video driver U, the video driver U may also amplify the voltage Vcc representing the high voltage of the reverse control signal mixed with the video signal in the blanking period and transmit the amplified one to the drive output u2. However, since the output n12 of the first inverter N1 may output a voltage signal having a low voltage level, the first P-type transistor Qp1 is conducted and the voltage of the ground terminal GND is provided to the first node A, and thus the voltage of the first node A is 0V. Since the voltage of the Video Output 402 is Vcc, a state where the voltage of the Video Output 402 is greater than the voltage of the first node A may be maintained all the time, so that the output p3 of the comparator P may be enabled to output a conduction control signal having a high voltage level all the time, and the first P-type transistor Qp1 may be ensured to be conducted and the voltage of the ground terminal GND to be provided to the first node A, and thus the voltage of the first node A is 0V, and thereby the video extender can be ensured to work normally when the voltage of the reverse control signal is a high voltage.

Then, the Video Output 402 may send the reverse control signal having a low voltage of 0V to the second resistance R2. The second resistance R2 and the third resistance R3 may achieve the function of impedance matching. Therefore, the voltage of the Video Output 402 is 0V, and the voltage of the Video Output 402 is smaller than or equal to the voltage of the first node A, so that the output p3 of the comparator P may output a cut-off control signal having a low voltage level. Therefore, the output n12 of the first inverter N1 may output a voltage signal having a high voltage level, and the first P-type transistor Qp1 may be cut off. The output n22 of the second inverter N2 may output a voltage signal having a high voltage level, and the second P-type transistor Qp2 may be cut off. Since the voltage of the Video Input 401 equals to the voltage of the video signal in the blanking period (0V), the voltage, of the video signal in the blanking period (0V) may be taken as the low voltage of the reverse control signal, so as to transmit the reverse control signal d to the image acquisition device at front end (not shown).

After the second stage T2 is completed, the work process of the second stage T2 may be performed repeatedly until the Video Output 402 stops sending the reverse control signal.

In the third embodiment, the time period in which the voltage of the first node A is $$Vcc * \frac{r3}{r2+r3}$$

may depend on the response delay of the comparator, the first inverter and the first P-type transistor.

Fourth Embodiment

Figure 6D:
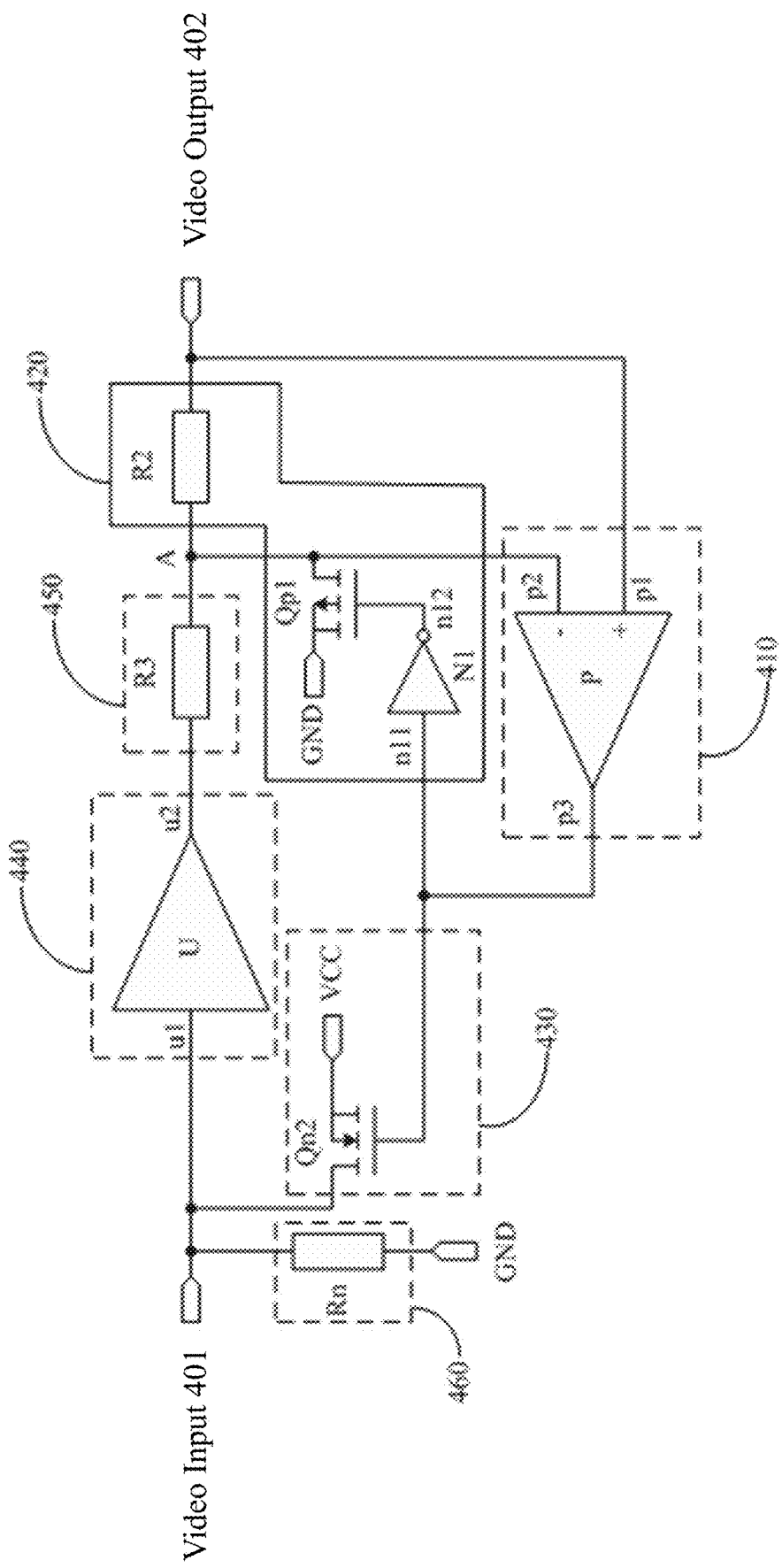
FIG. 6D illustrates a schematic diagram of a video extender according to some embodiments of the present disclosure.

Description will be made while taking the structure of the video extender shown in FIG. 6D as example. The corresponding signal timing diagram of input and output is shown in FIG. 7. As illustrated in FIG. 7, when the video signal is in the non-blanking period, transmission of the video signal is performed. When the video signal is in the blanking period, transmission of the reverse control signal is performed. When the reverse control signal is transmitted, two stages, a first stage T1 and a second stage T2 shown in FIG. 7 will be described in detail as examples, wherein the first stage T1 is a stage in which the video signal is in the non-blanking period and the second stage T2 is a stage in which the reverse control signal is sent.

In the first stage T1 where the video signal is in the non-blanking period, the Video Input 401 may send the video signal, and the video driver U may receive the video signal through the drive receiver u1, amplify the same, and then output the amplified video signal through the drive output u2. The amplified video signal may be transmitted to the first node A through the third resistance R3, and then transmitted to the Video Output 402 through the second resistance R2, so that the function of transmitting the video signal in the non-blanking period is achieved. The matching resistance Rn may achieve a function of resistance matching. Since the transmission direction of the video signal in the non-blanking period is from the Video Input 401 to the Video Output 402, the voltage of the first node A may be equal to or greater than the voltage of the Video Output 402, thus the comparator P may be enabled to output a cut-off control signal having a low voltage level, and the output n12 of the first inverter N1 may be enabled to output a voltage signal having a high voltage level. The cut-off control signal having the low voltage level and the voltage signal having the high voltage level may cause the first P-type transistor Qp1 and the second N-type transistor Qn2 may be enabled to be in a cut-off state, and thus the transmission process of the video signal in the non-blanking period is not influenced.

In the second stage T2, the Video Output 402 may send the reverse control signal to the second resistance R2. The voltage of the reverse control signal is a high voltage and the voltage amplitude equals to Vcc, so that the voltage of the Video Output 402 is Vcc. The second resistance R2 and the third resistance R3 can achieve the function of impedance matching. Since the video signal in the blanking period may arrive at the drive output u2 of the video driver U after passing through the video driver U, the voltage of the drive output u2 is a low voltage and is 0V. Since the second resistance R2 and the third resistance R3 are connected between the output u2 of the video driver U and the Video Output 402 in series, the voltage of the first node A is $$Vcc * \frac{r3}{r2+r3}.$$

Since the voltage of the Video Output 402 is Vcc, the voltage of the first node A is $$Vcc * \frac{r3}{r2+r3},$$

the voltage of me Video Output 402 is thus greater than the voltage of the first node A. Thus, the voltage of the forward input p1 of the comparator P is greater than the voltage of the inverting input p2, the output p3 of the comparator P may output a conduction control signal having a high voltage level. Therefore, the voltage of the output n12 of the first inverter N1 is a voltage signal having a low voltage level. Since the second N-type transistor Qn2 is conducted under the control of the conduction control signal and the voltage Vcc of the reference voltage end VCC may be provided to the Video Input 401, and thus the voltage Vcc representing the high voltage of the reverse control signal is mixed with the video signal in the blanking period through the Video Input 401, so as to transmit the mixed one to the image acquisition device at front end. Since the Video Input 401 is connected to the drive receiver u1 of the video driver U, the video driver U may also amplify the voltage Vcc representing the high voltage of the reverse control signal mixed with the video signal in the blanking period and transmit the amplified one to the drive output u2. However, since the output n12 of the first inverter N1 may output a voltage signal having a low voltage level, the first P-type transistor Qp1 is conducted and the voltage of the ground terminal GND is provided to the first node A, and thus the voltage of the first node A is 0V. Since the voltage of the Video Output 402 is Vcc, a state where the voltage of the Video Output 402 is greater than the voltage of the first node A may be maintained road the time, so that the output p3 of the comparator P may be enabled to output a conduction control signal having a high voltage level all the time, and the first P-type transistor Qp1 may be ensured to be in a short circuit state and the voltage of the ground terminal GND to be provided to the first node A, and thus the voltage of the first node A is 0V, and thereby the video extender can be ensured to work normally when the voltage of the reverse control signal is a high voltage.

Then, the Video Output 402 may send the reverse control signal having a low voltage of 0V to the second resistance R2. The second resistance R2 and the third resistance R3 can achieve the function of impedance matching. Therefore, the voltage of the Video Output 402 is 0V, and the voltage of the Video Output 402 is smaller than or equal to the voltage of the first node A, so that the output p3 of the comparator P may output a cut-off control signal having a low voltage level. Therefore, the output n12 of the first inverter N1 may output a voltage signal having a high voltage level, the first P-type transistor Qp1 may be cut off, and the second N-type transistor Qn2 may be cut off. Since the voltage of the Video Input equals to the voltage of the video signal in the blanking period (0V), the voltage of the video signal in the blanking period (0V) may be taken as the low voltage of the reverse control signal, so as to transmit the reverse control signal to the image acquisition device at front end (not shown).

After the second stage T2 is completed, the work process of the second stage T2 is performed repeatedly until the Video Output 402 stops sending the reverse control signal.

In the fourth embodiment, the time period in which the voltage of the first node A is may depend on the response delay of the comparator, the first inverter and the first P-type transistor.

As can be seen from the first to fourth embodiments, in the above video extender provided in the embodiments of the present disclosure, through a simple structure, the transmission of the video signal in the non-blanking period can be achieved, the false triggering phenomenon when the video signal is in the non-blanking period can be suppressed, all the extracted reverse control signals are effect signals, and a secondary extraction on the reverse control signal can be avoided when the effect signals of the extracted reverse control signals are input to the Video Input 401 for transmission, so that the positive feedback effect can be avoided.

Based on the same invention concept, the present disclosure may further provide a control method for any one of the above video extenders provided in the embodiments of the present disclosure, as shown in FIG. 8. The method may include a first stage and a second stage.

In S801, in the first stage, the video drive module 440 may receive a video signal sent by a Video Input 401, amplify the received video signal and transmit the amplified video signal to a first node. The closed loop suppression module 420 may receive the video signal transmitted to the first node and transmit the received video signal to the Video Output 402.

In S802, in the second stage, the closed loop suppression module 420 may receive a reverse control signal sent by the Video Output 402 and adjust a voltage of the first node and a voltage of the Video Output 402 according to the voltage of the reverse control signal. The reverse control extraction module 410 may receive the voltage of the Video Output 402 and the voltage of the first node, and output a conduction control signal only when the voltage of the Video Output 402 is greater than the voltage of the first node. The reverse control superimposing module 430 may receive the conduction control signal and provide a reference voltage signal of a reference voltage end to the Video Input 401 under the control of the received conduction control signal.

With the control method for the above video extender, amplification and transmission from the Video Input 401 to the Video Output 402 can be achieved, thereby achieving an extended video enhancement. When the video signal is in the blanking period and reverse control is performed, the reverse control signal may be extracted from the Video Output 402 and transmitted to the Video Input 401, and the reverse control signal sent to the Video Input 401 may be avoided to be amplified by the video drive module 440 and to interfere with the ongoing extract process for the reverse control signal, thereby the positive feedback effect is avoided.

Based on the same invention conception, the embodiment of the present disclosure may further provide a coaxial video-controlling transmission device, including any one of the above video extenders provided in the embodiments of the present disclosure. The principle of the coaxial video-controlling transmission device to solve the problems is same as the video extender, so that the implementation of the coaxial video-controlling transmission device may refer to the implementation of the video extender, and not repeated herein. Other essential components of the coaxial video-controlling transmission device are those can be understood by those skilled in the art, which are not described herein, and are not intended to limit the present disclosure.

The video extender, the control method therefor and the coaxial video-controlling transmission device provided in the present disclosure may include the reverse control extraction module 410, the closed loop suppression module 420, the reverse control superimposing module 430 and the video drive module 440. Through the cooperation of the four modules, amplification and transmission from the Video Input 401 to the Video Output 402 can be achieved when the video signal is in the non-blanking period, thereby achieving extended video enhancement and avoiding false triggering in the non-blanking period. When the video signal is in the blanking period and reverse control is performed, the reverse control signal may be extracted from the Video Output 402 and transmitted to the Video Input 401, and the reverse control signal sent to the Video Input 401 may be avoided to be amplified by the video drive module 440 and to interfere with the ongoing extract process for the reverse control signal, so that the positive feedback effect is avoided. Therefore, the transmission of the video signal and extraction of the reverse control signal can be realized without the need of adopting a processor having A/D and D/A conversion functions, so that the structure of the video extender may be simplified and the cost may be lowered.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A system for transmitting video signals, comprising at least one transmission controller, the at least one transmission controller including:
   a closed loop suppression module coupled to a node and a Video Output, wherein
   the Video Output is configured to output a reverse control signal,
   the node is coupled to the Video Output via the closed loop suppression module, and
   the closed loop suppression module is configured to:
      receive the reverse control signal, and
      adjust a voltage of the node according to a voltage of the reverse control signal.

2. The system of claim 1, wherein the at least one transmission controller further includes a reverse control extraction module configured to:
   detect the voltage of the node and a voltage of the Video Output; and
   output a conduction control signal when the voltage of the Video Output is larger than the voltage of the node.

3. The system of claim 2, wherein the video signals are transmitted from a Video Input, and the at least one transmission controller further includes a reverse control superimposing module configured to:
   receive the conduction control signal; and
   provide a reference voltage signal of a reference voltage end to the Video Input, in response to the receipt of the conduction signal.

4. The system of claim 3, wherein the reverse control extraction module includes a comparator, wherein:
   a forward input of the comparator is coupled to the Video Output and is configured to detect the voltage of the Video Output;
   an inverting input of the comparator is coupled to the node and is configured to detect the voltage of the node; and
   an output of the comparator is coupled to the closed loop suppression module and the reverse control superimposing module, and is configured to output the conduction control signal to the closed loop suppression module and the reverse control superimposing module.

5. The system of claim 3, wherein the reverse control superimposing module includes an N-type transistor, wherein:
a grid electrode of the N-type transistor is configured to receive the conduction control signal, a source electrode of the N-type transistor is coupled to the reference voltage end, and a drain electrode of the N-type transistor is coupled to the Video Input.

6. The system of claim 3, wherein the reverse control superimposing module includes a P-type transistor and an inverter, wherein:
an input of the inverter is configured to receive the conduction control signal, an output of the inverter is coupled a grid electrode of the P-type transistor, a source electrode of the P-type transistor is coupled to the reference voltage end, and a drain electrode of the P-type transistor is coupled to Video Input.

7. The system of claim 3, wherein the reverse control signal has a first voltage level or a second voltage level smaller than the first voltage level.

8. The system of claim 7, wherein the first voltage level is equal to a voltage of the reference voltage end.

9. The system of claim 7, wherein the second voltage level is 0V.

10. The system of claim 2, wherein the closed loop suppression module includes a resistance and an N-type transistor, wherein:
the resistance is coupled between the node and the Video Output, a grid electrode of the N-type transistor is configured to receive the conduction control signal, a source electrode of the N-type transistor is coupled to a ground terminal (GND), and a drain electrode of the N-type transistor is coupled to the node.

11. The system of claim 2, wherein the closed loop suppression module includes a resistance and a P-type transistor, and a inverter, wherein:
the resistance is coupled between the node and the Video Output, an input of the inverter is configured to receive the conduction control signal, an output of the inverter is coupled to a grid electrode of the P-type transistor, a source electrode of the P-type transistor is coupled to a ground terminal (GND), and a drain electrode of the P-type transistor is coupled to the node.

12. The system of claim 1, wherein the video signals are transmitted from a Video Input, and the at least one transmission controller further includes a video driver coupled to the Video Input.

13. The system of claim 12, wherein the video driver is configured to amplify the video signals transmitted from the Video Input, and wherein:
an input of the video driver is coupled to the Video Input to receive the video signals; and
an output of the video driver is coupled to the node to send the amplified video signals to the node.

14. The system of claim 13, wherein the at least one transmission controller further includes a drive output protection module, and the video driver is coupled to the node through the drive output protection module.

15. The system of claim 14, wherein the drive output protection module is configured to receive the amplified video signals from the video driver, and transmit the amplified video signals to the node.

16. The system of claim 15, wherein the drive output protection module includes a resistance, wherein:
a first end of the resistance is coupled to the video driver to receive the amplified video signals from the video driver, and
a second end of the resistance is coupled to the node to transmit the received amplified video signals to the node.

17. The system of claim 1, wherein the at least one transmission controller further includes an impedance matching module including a matching resistance.

18. The system of claim 17, wherein the video signals are transmitted from a Video Input, a first end of the matching resistance is coupled to the Video Input, and a second end of the matching resistance is coupled to a ground terminal (GND).

19. The system of claim 1, wherein the closed loop suppression module is further configured to receive the video signals from the node, and transmit the received video signals to the Video Output.

20. The system of claim 1, wherein the reverse control signal has a first voltage level or a second voltage level smaller than the first voltage level, and the at least one transmission controller is at least configured to:
adjust the voltage of the node to be smaller than the voltage of the Video Output, when the reverse control signal has the first voltage level; or
adjust the voltage of the node to be larger than the voltage of the Video Output, when the output control signal has the second voltage level.

* * * * *